United States Patent [19]

Sibley

[11] Patent Number: 4,471,486

[45] Date of Patent: Sep. 11, 1984

[54] VITAL COMMUNICATION SYSTEM FOR TRANSMITTING MULTIPLE MESSAGES

[75] Inventor: Henry C. Sibley, Adams Basin, N.Y.

[73] Assignee: General Signal Corporation, Stamford, Conn.

[21] Appl. No.: 273,299

[22] Filed: Jun. 15, 1981

[51] Int. Cl.³ .............................................. G06F 11/00
[52] U.S. Cl. ..................................... 371/53; 364/200; 364/900; 371/25; 371/14; 371/18
[58] Field of Search ........................ 371/52, 14, 18, 69, 371/48, 70, 54, 71, 25, 72, 53, 67; 364/900, 200; 340/505, 518, 825.06, 500, 514, 517

[56] References Cited

U.S. PATENT DOCUMENTS

| | | | |
|---|---|---|---|
| 3,711,836 | 1/1973 | Dirks | 364/200 |
| 3,714,636 | 1/1973 | Manly | 364/900 |
| 3,757,309 | 9/1973 | Hashizume et al. | 364/900 |
| 3,766,528 | 10/1973 | Ichida | 364/900 |
| 3,886,325 | 5/1975 | Dorr et al. | 364/200 |
| 3,978,449 | 8/1976 | Sanders et al. | 371/70 |
| 4,070,648 | 1/1978 | Mergenthaler et al. | 371/70 |
| 4,090,173 | 5/1978 | Sibley | 371/52 |
| 4,142,243 | 2/1979 | Bishop et al. | 364/900 |
| 4,149,244 | 4/1979 | Anderson et al. | 364/200 |
| 4,160,240 | 7/1979 | Partipilo | 371/70 |
| 4,270,168 | 5/1981 | Murphy et al. | 364/200 |
| 4,307,463 | 12/1981 | Sibley | 371/69 |
| 4,334,307 | 6/1982 | Bourgeois et al. | 364/200 |
| 4,366,478 | 12/1982 | Masuda | 371/70 |
| 4,368,534 | 1/1983 | Sibley | 371/70 |

Primary Examiner—Jerry Smith
Assistant Examiner—Jameson Lee
Attorney, Agent, or Firm—Pollock, Vande Sande & Priddy

[57] ABSTRACT

A vital communication system includes a conventional, that is non-vital, communication link, a transmitter and a receiver. The transmitter is responsive to input data, and provides for encoding and transmission as well as checking of its own input arrangement. The encoding and transmission is effected by a program driven device, but as loaded the program is incomplete. The checking produces certain check words which are used to complete the program so that only in those instances in which the checks are passed, will an appropriate message be transmitted. The receiver includes a decoder logic as well as a decoder check logic. The messages are decoded and applied to an output device. The decoder check logic checks that the information supplied to the output device corresponds to the decoded information, and if the check is passed, the output device is enabled to output the information to the outside world.

11 Claims, 18 Drawing Figures

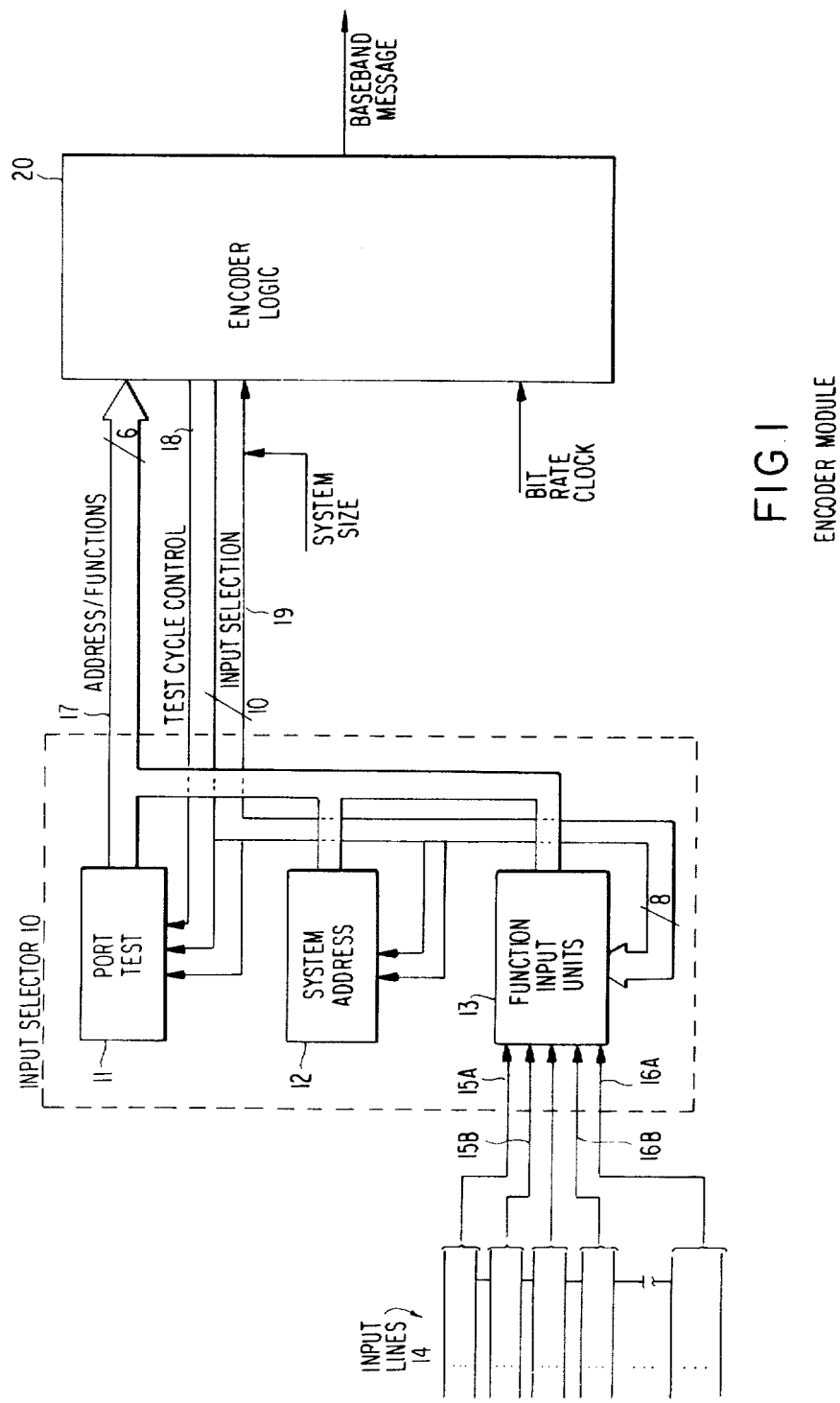
FIG.1 ENCODER MODULE

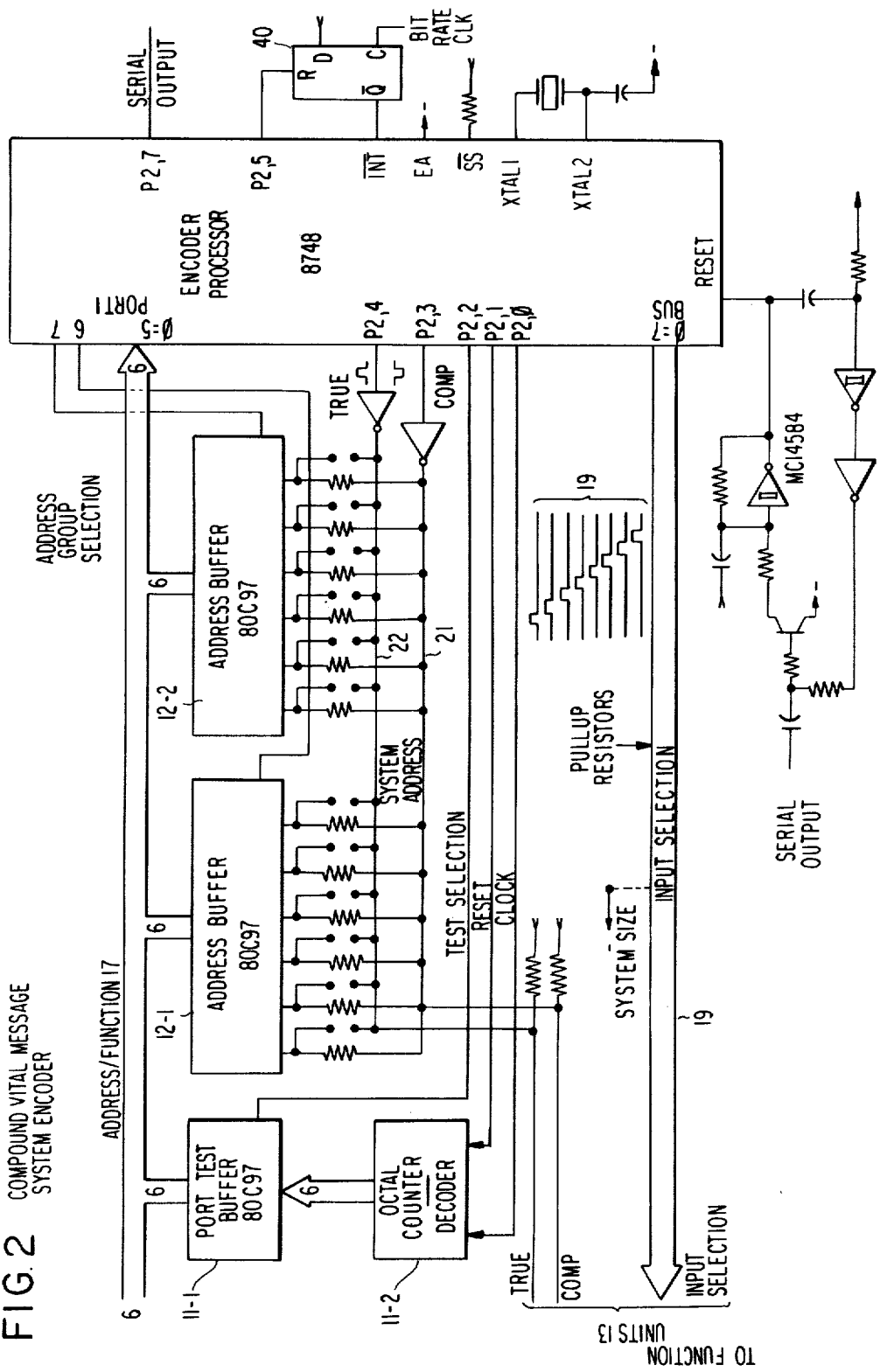
FIG. 2 COMPOUND VITAL MESSAGE SYSTEM ENCODER

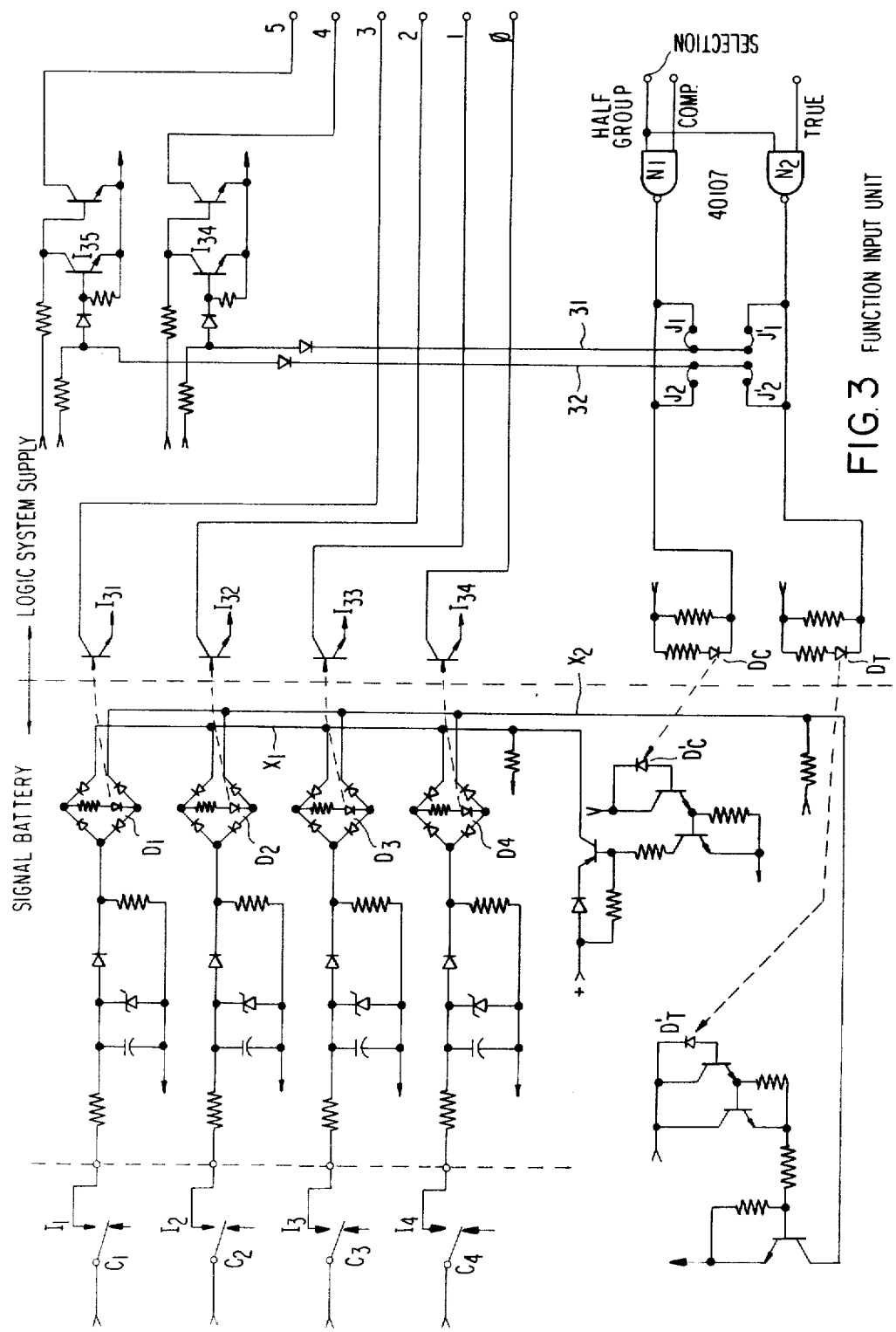
FIG.3 FUNCTION INPUT UNIT

| OUTPUT | INPUT | | | | | | |
|---|---|---|---|---|---|---|---|
| TRUE ENCODED WORD | TRUE DATA INPUT | | | | | TRUE GROUP ADDRESS INPUT | |
| | 0 | 1 | 2 | 3 | | 4 | 5 |
| 1 1 0 0 0 0 | 0 | 0 | 0 | 1 | | | |
| 1 0 1 0 0 0 | 0 | 0 | 1 | 0 | | | |
| 1 0 0 1 0 0 | 0 | 0 | 1 | 1 | | | |
| 1 0 0 0 1 0 | 0 | 1 | 0 | 0 | | | |
| 1 0 0 0 0 1 | 0 | 1 | 0 | 1 | | | |
| 0 1 1 0 0 0 | 0 | 1 | 1 | 0 | | | |
| 0 1 0 1 0 0 | 0 | 1 | 1 | 1 | AND ONE OF THESE | 0 | 0 |
| 0 1 0 0 1 0 | 1 | 0 | 1 | 0 | | 0 | 1 |
| 0 1 0 0 0 1 | 1 | 0 | 0 | 1 | | 1 | 0 |
| 0 0 1 1 0 0 | 1 | 0 | 1 | 0 | | 1 | 1 |
| 0 0 1 0 1 0 | 1 | 0 | 1 | 1 | | | |
| 0 0 1 0 0 1 | 1 | 1 | 0 | 0 | | | |
| 0 0 0 1 1 0 | 1 | 1 | 0 | 1 | | | |
| 0 0 0 1 0 1 | 1 | 1 | 1 | 0 | | | |
| 0 0 0 0 1 1 | 1 | 1 | 1 | 1 | | | |
| 0 0 0 0 1 0 | 0 | 0 | 0 | 0 | | | |

FIG 4A

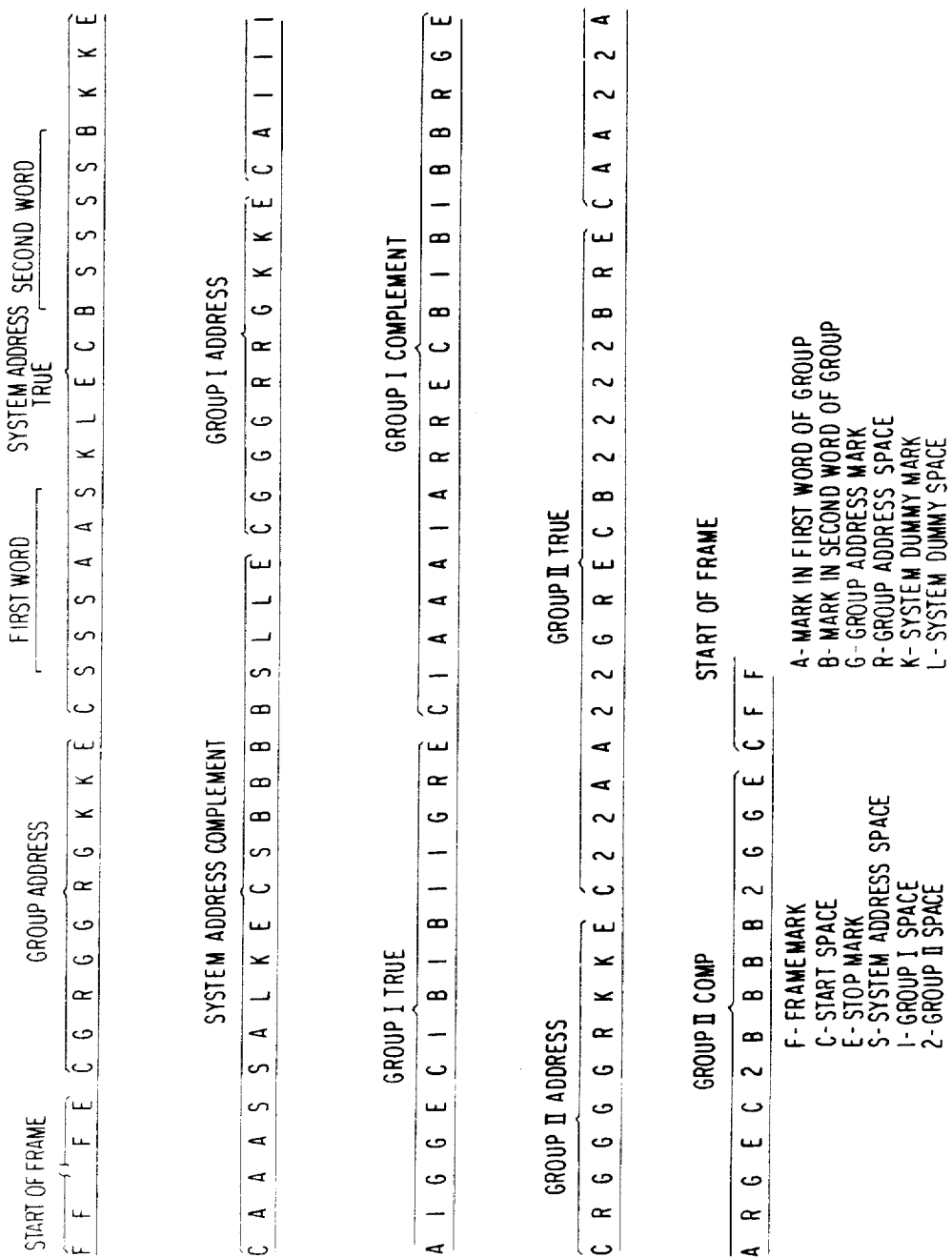

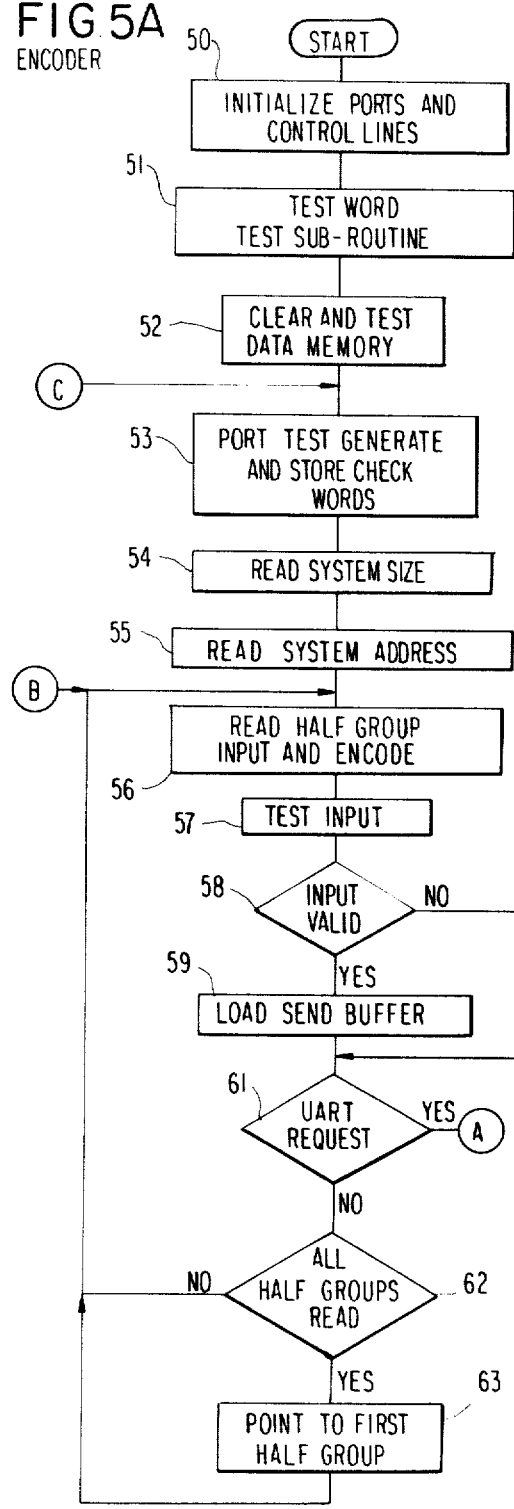
FIG. 5A ENCODER
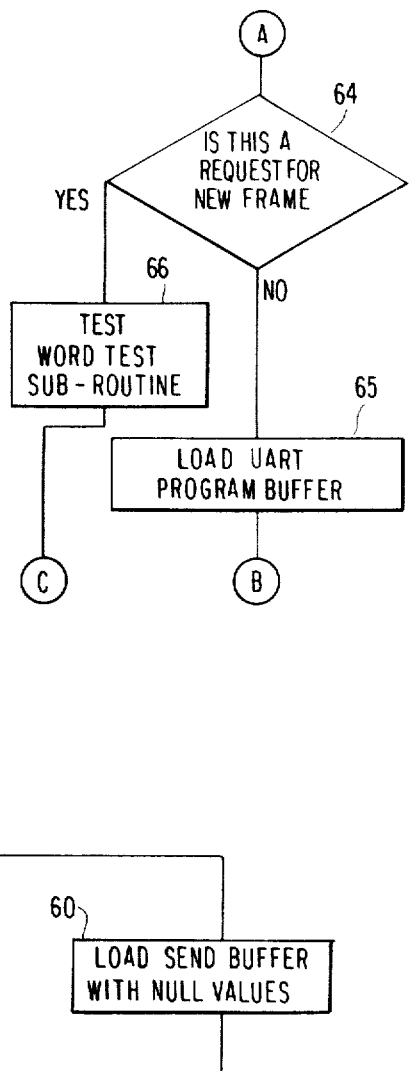
FIG. 5B UART SERVICE

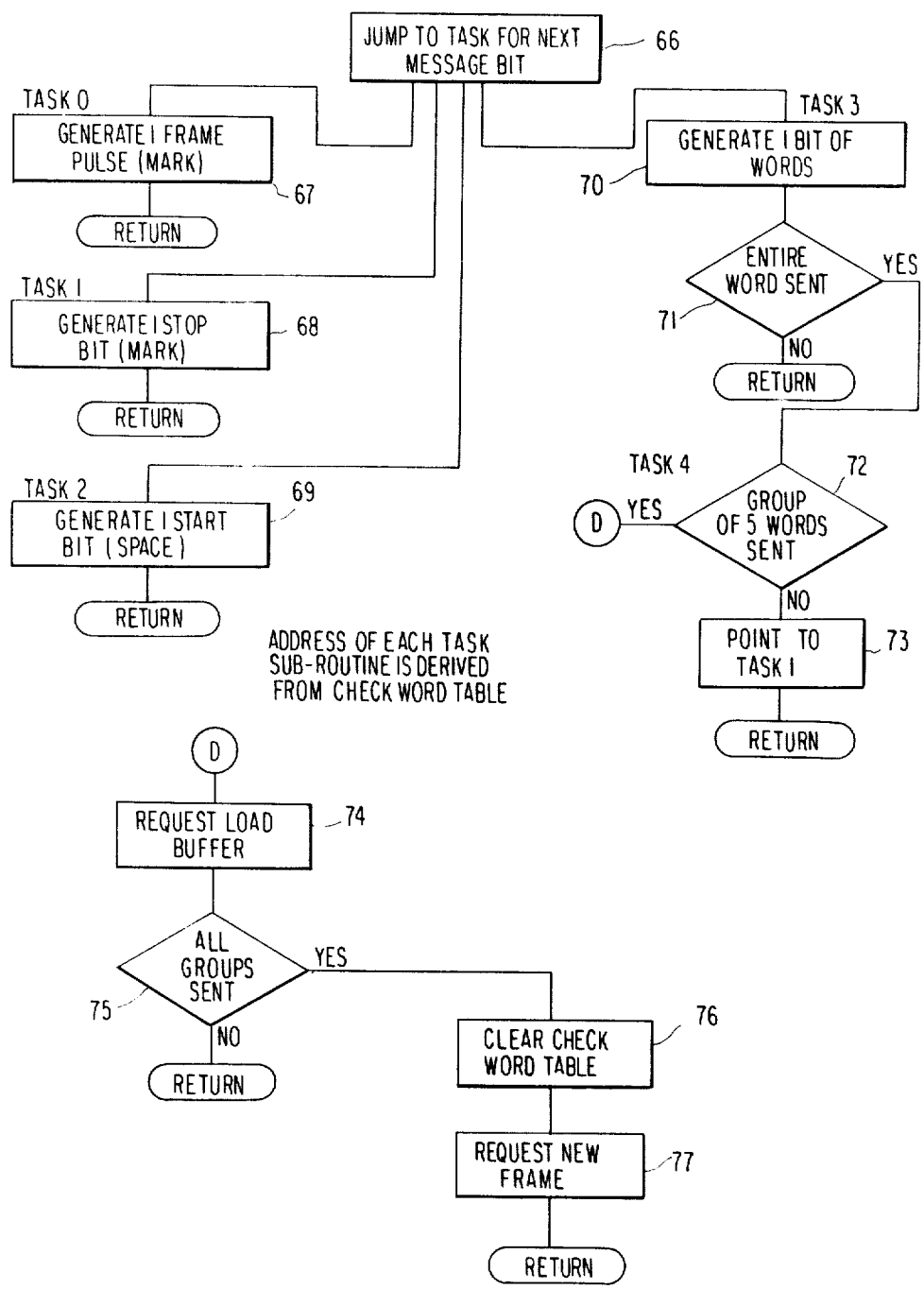
FIG. 5C INTERRUPT HANDLER

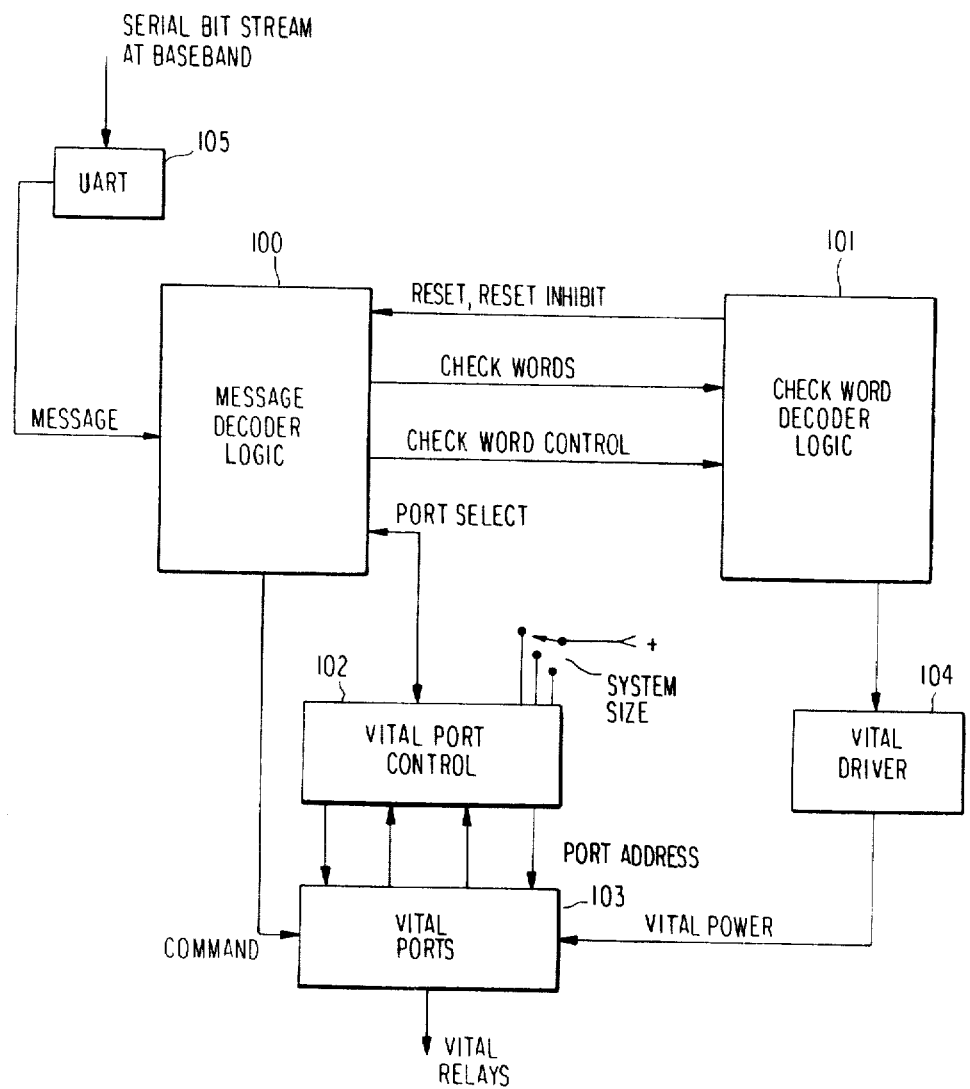
FIG. 6  MESSAGE DECODER MODULE

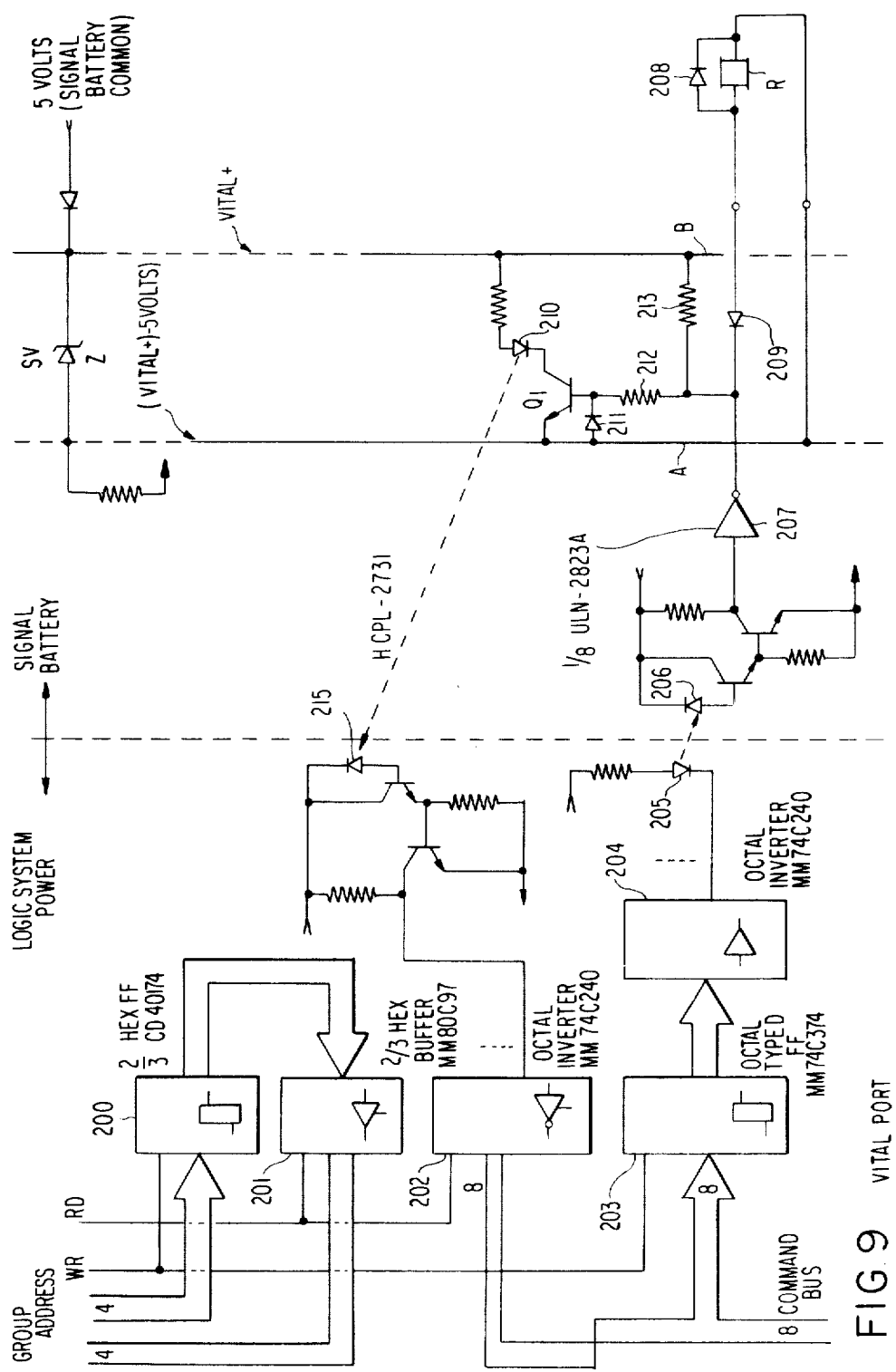
FIG 9 VITAL PORT

4,471,486

VITAL COMMUNICATION SYSTEM FOR TRANSMITTING MULTIPLE MESSAGES

FIELD OF THE INVENTION

The present invention relates to digital communication systems, and more particularly vital digital communication systems, i.e., those systems arranged to transmit vital signals over non-vital communication links.

BACKGROUND OF THE INVENTION

The advantages of digital communication systems, in accurately communicating information, is well documented in the literature. The statistical properties of many communication systems naturally leads to a requirement for greater and greater complexity as a necessity in attempting to reach lower and lower probabilities of error. The particular error level that can be tolerated in a communication sytem, of course, depends on the type of information being communicated. For example, it is well-known that digitally quantized speech is relatively tolerant of errors. In the field of traffic control (for example railroad or the like) the past practice has been to communicate non-vital information from a control center to field equipment (switches, signals, etc.) and this required the vital (safety) functions to be field implemented. If the communications could be effected vitally, even though the link itself were non-vital, then considerable savings could be effected. In noncommunication systems, efforts are made in the design to ensure that the occurrence of a failure or errors are "fail safe" in that the system is arranged to limit the probability of an error resulting in a less restrictive situation to a vanishingly small number of improbable situations. In a system which is 100% fail safe, errors can be tolerated, but those errors lead to a control condition which is no more dangerous than had the error not occurred. In other words, errors tend to result in a more restrictive condition, rather than a less restrictive condition.

Because of the complexity of present day control systems there is no quantative measure of the degree to which a system is fail safe; however, there are well developed techniques which can be used to increase the probability that a particular component or set of components is fail safe. One particular area which has received attention is that of communicating vital information over a non-vital communication links. One system for effecting this function is shown in my prior U.S. Pat. No. 4,090,173, assigned to the assignee of this application.

In that system a particular message is composed of a pair of words, one being the complement of the other, separated by a framing pattern to allow for ready identification of the message words themselves. For example, a six bit message word, while capable of transmitting any one of 64 messages, is, in the arrangement shown in the referenced patent used to transmit a lesser number of messages by restricting the valid words to words which have a constant ratio of marks ("1") to spaces ("0"). In the example disclosed in the patent, each six bit word has two marks thus allowing 15 different messages to be communicated by a single pair of words. This message required 12 bits, 6 for each word, plus in the example shown in the patent, four bits, two for each framing pattern, for a total of 16 bits. While restricting the word makeup does reduce the system efficiency, it has the advantage of increasing the probability of identifying errors in that any word which does not have the specified ratio of marks to spaces can be clearly identified as an error.

While the communication system disclosed in the above-referenced patent works quite well, there is a desire to increase the capability of the communication system so that the system is capable of sending more than 15 different messages, as well as the capability of multiplexing, so that more than one message at a time can be transmitted.

The above-referenced patent illustrates a system which may use discrete logic or random logic such as a microprocessor, and in the latter case identifies exemplary operating routines to ensure that the microprocessor element is no more likely to be the cause of errors, than any other component. However, the limited capability of the disclosed system, does not provide for the transmission of multiple messages.

Therefore, it is an object of the invention to provide a vital communication system which has the capability of transmitting multiple messages. It is another object of the present invention to provide such a system which can be accurately termed fail safe notwithstanding the fact that a communication link coupling a transmitter and a receiver, is nonvital. The system to be disclosed hereinafter employs a number of techniques to increase the fail safe qualities. One technique that is employed is cycle checking.

Digital systems, especially binary, are vulnerable to "stuck bits" unless they are implemented with specially designed fail safe logic. Since it is an object of the invention to capitalize on the advantages of commercially available microprocessors, to the extent that such devices are employed it is clear that they do not employ fail safe logic elements. The cycle checking technique, used as a safeguard against the stuck bit, provides ready proof that all devices can be controlled to both their states, thus ensuring that a stuck bit error has not occurred. This is effected by processing data along with its logical complement so that all devices in the processing stream are driven to both their states.

A second technique employed is diversity. This is especially important in employing commercially available microprocessors since a failed device in a memory location or instruction decoder can result in a program being executed incorrectly. By using more than one program segment to do the same task and requiring complete agreement in the results at all critical points, incorrect execution, without recognition of that incorrect execution, is minimized. To employ diversity properly, there must be no common elements in the diverse systems that could result in compensating errors.

Notwithstanding these two techniques, however, if two lines at an input or an output port of a microprocessor were connected together as the result of an insulation failure, cycle and diversity checking may not reveal this fault. Accordingly, a port test, which has some similarity to the port test disclosed in the above-referenced patent, is employed to detect failures of this type.

SUMMARY OF THE INVENTION

In accordance with the invention the vital communication system includes a conventional communication link, which can take a wide variety of forms, connecting a transmitter and a receiver. The transmitter is responsive to input data, hereinafter termed functions, and includes an input selector. The input selector may group the functions for ready encoding, and provides the grouped functions to encoder logic. The encoder logic in addition to providing the encoded message for delivery provides signals to the input selector for timing, etc.

Each different input to the communication system is present on a different input line and exists in binary form as a voltage level either above or below some fixed threshold. In order to simplify the encoding process the plurality of input lines are grouped, wherein each group consist of some fixed number of input lines; in an embodiment of the invention each group comprises eight input lines; therefore there are a number (N) of groups (where $N \geq 1$) which is equal to the number of input lines divided by 8. Thus, each of the groups provides a digital word wherein each bit represents a different input line. The encoder logic scans the groups in turn, and provides a different message for each group. The message comprises a message word and its complement separated by a particular bit pattern. In addition, each group is identified by an address, and therefore the message produced by the encoder logic also appends an address to the encoded serial stream which is the output of the encoder logic.

To effect the scanning of the different groups the encoder logic provides enabling signals to the different groups, in turn, to enable the different groups to generate its corresponding digital word. Accordingly, the encoder logic provides a different enabling line for each of the different groups. Typically, the encoder logic is capable of handling a particularly selected maximum number M of different groups, and therefore, the encoder logic provides M different enabling signal lines; each of the lines actually used is coupled to one of the groups; if there are any unused enablement lines a selected one of the unused enablement lines is connected to a fixed potential. The encoder logic, in addition to sequentially providing enablement signals to the different groups, also senses the fixed potential on the selected and unused enablement line which is used by the encoder logic to define the number of associated groups. This information is also employed by the encoder logic to determine when a scan of the groups is completed.

The encoder logic also includes a port testing apparatus for testing the encoder logic input port to ensure that the input port is faithfully following the signals provided to it. The port testing apparatus includes a buffer connected to the input port whose state is controlled by the encoder logic. At selected times the state of the buffer is controlled and then read by the encoder logic to enable the port testing operation. This operation generates check words and, as will become clear the proper check words are essential to normal operation.

Two half groups, each four bits long, comprise a group which therefore consists of eight bits. Each system is capable of transmitting sixteen groups for a total of 128 bits. The system size is input to the encoder logic where it is used to determine whether or not the encoder logic has received the expected number of input words or not, the latter of course being an error condition. In addition, the port test, when completed, results in the storage of one or more check words indicative of the results of the test. As will become clear hereinafter the encoder logic employs the check words generated in the port test to determine whether or not the test was passed.

The manner in which the different group inputs are handled, that is, the manner in which the potential is sensed and the digital signal generated is disclosed more completely in co-pending application Ser. No. 225,813 assigned to the assignee of this application.

The encoder logic also performs the UART function of formatting and outputing the assembled message. The encoder logic relies, for the message formatting and outputing function, on the previously mentioned check words. In the absence of the proper number, sequence and value of these check words either no message is transmitted or an invalid message (one which will not be accepted by the decoder) is transmitted. Furthermore, since the check words, once used, are cleared, subsequent messages require subsequent check words. In this fashion the encoder's present state of health is reflected in the transmitted messages.

Accordingly, it is an important feature of this invention that the checking operation results in information which is essential to a proper output. This output device is program driven, but as loaded the output program is incomplete. It is the check words, loaded in the course of input processing, that complete the output program.

The decoder module comprises a UART decoder logic, vital ports, one for each corresponding group at an associated encoder module, and decoder check logic. Basically, the UART strips framing, start and stop bits and passes on 8 bit words, pairs corresponding to a message word, both true or complement. In the case of system address words, the decoder module checks to ensure that true and complement words are actually as expected and compares true and complement to a locally read address.

In the case of message words, the true and complement nature is verified. The two eight bit encoded words in each message word are decoded to yield two four bit half group words and four bits of group address. These are loaded into vital stacks and output to the vital ports. After verifying that the vital ports have read what was written the decoder module returns to process another group. During the course of processing in the decoder logic, a series of check words are created; these are concurrently passed to a decoder check logic for concurrent processing. If the sequence of check words form an appropriate pattern the decoder check logic outputs a unique signal which is used to control power to the vital ports.

BRIEF DESCRIPTION OF THE DRAWINGS

The present invention will be described so as to enable those skilled in the art to make and use the same in the following portions of the specification when taken in conjunction with the attached drawings in which like reference characters identify identical apparatus and in which:

FIG. 1 is a block diagram of an encoder module in accordance with the present invention;

FIG. 2 is a schematic of a major portion of FIG. 1 showing the encoder processor, system address and port test sub-system;

FIG. 3 is a schematic of a typical half group input unit;

FIG. 4A is a table illustrating data input and corresponding encoded output;

FIG. 4B illustrates the makeup of a typical message frame;

FIGS. 5A–5C comprise a flow chart of the encoder processor program;

FIG. 6 is a block diagram of a typical decoder module in accordance with the invention;

FIG. 9 is a schematic of a typical port, showing in detail, a single bit position of the port.

DETAILED DESCRIPTION OF PREFERRED EMBODIMENT

Figure 7:
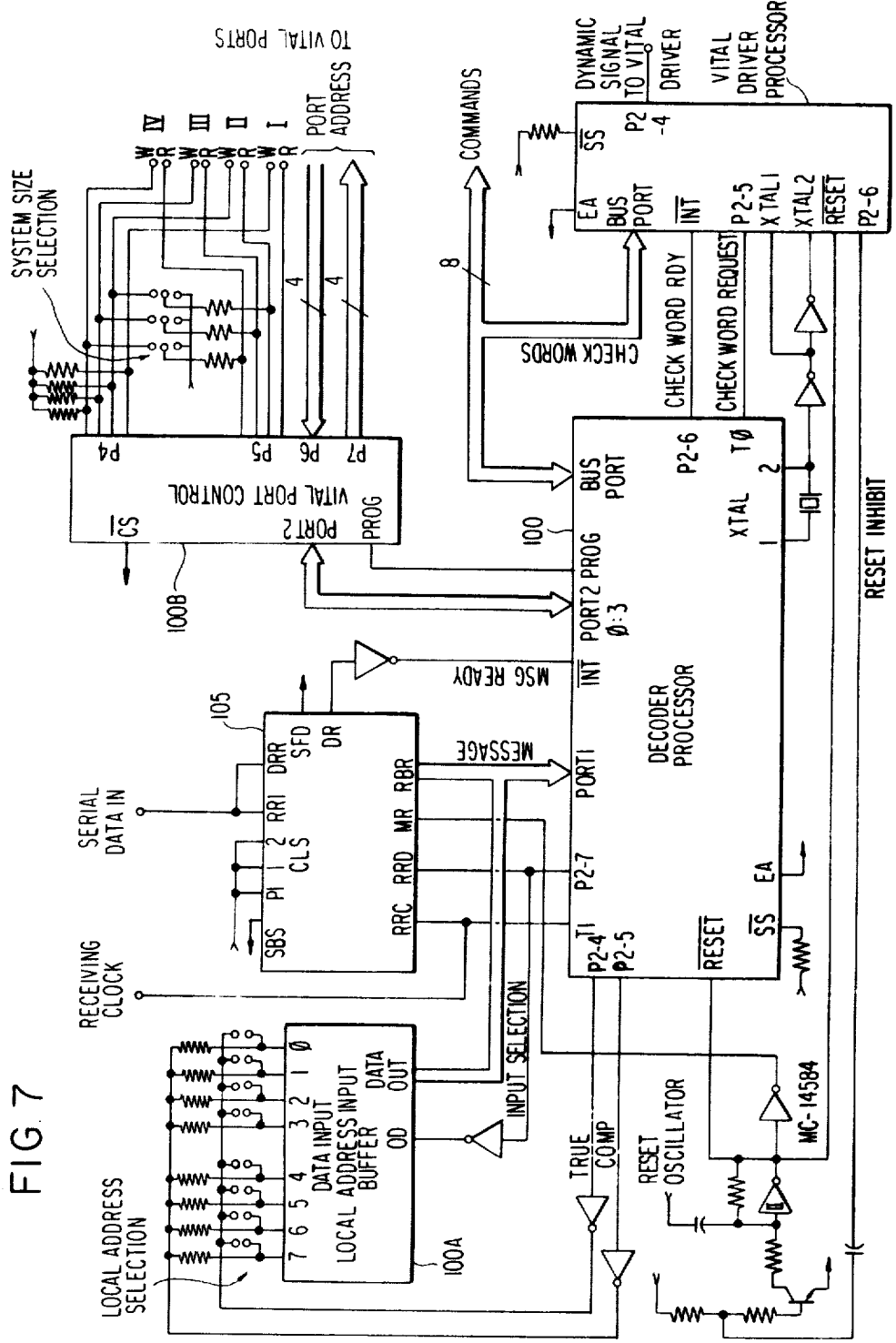
FIG. 7 is a schematic of a major portion of FIG. 6 showing message decoder processor, check decoder processor and the UART.

FIG. 1 is a block diagram of the encoder module in accordance with the present invention. The encoder module, as is shown in FIG. 1, comprises an input selector 10 and encoder logic 20. The input selector 10 comprises three sub-systems, the port test 11, the system address 12 and the function input units 13. The function input units 13 are directly connected to the input lines 14, a different function unit is provided for each 8 input lines, and each function unit comprises two function half units, each function half unit corresponding to a half group. Thus, as is shown in FIG. 1 the input lines 14 are grouped 4 lines per half group such that a group 15 is coupled to half groups 15A and 15B, each half group comprising 4 lines; similarly, group 16 comprises half groups 16A and 16B, each half group including a different four lines.

The input selector 10 is coupled to the encoder logic 20 via a plurality of signal lines, a six bit address/function bus 17, a test cycle control conductor 18 and an input selection bus 19. The input selection bus 19 is also connected to a system size indicator as will be explained hereinafter. The encoder logic 20 itself, in addition to the foregoing inputs and outputs from the input selector 10 provides a digital signal stream at an output pin corresponding to the encoded message, and also receives a bit rate clock input.

In a particular embodiment of the invention the encoder logic 20 has three eight bit ports. Port 1 is coupled to the 6 bit address and function bus 17. Two other bits of port 1 are used for system address selection and are thus connected to the input selection bus 19. The input selection bus 19 also includes 8 bits of another port to individually select 4 groups or 8 half groups. Finally, two bits of the third port control the port test logic (and thus comprise two additional conductors in the input selection bus 19), two additional bits provide timing to the function inputs and finally the last bit of this port is the output. The bit rate clock shown in FIG. 1 is used to interrupt the processor at the start of each modem baud interval. In the alternative, the bit rate could be controlled by a timer included in the processor if the bit rate were fixed; using an external clock as shown in FIG. 1 simplifies the task of satisfying different bit rate requirements.

FIG. 2 is a detailed block diagram, illustrating in addition to the encoder logic 20, the port test apparatus 11 and the system address apparatus 12.

FIG. 2 is configured for an INTEL 8748 (8048 microprocessor). Notwithstanding the advantages of the use of a microprocessor (and it should be apparent that other microprocessors beside the 8048 could be employed) those skilled in the art will also be aware, as this description proceeds, that the invention is not restricted to the use of microprocessors, but other digital processors could also be employed instead.

The system address sub-system 12 comprises a pair of 6 bit address buffers 12-1 and 12-2. Two bits of the port 1 output are connected respectively to an enabling input of the buffers 12-1 and 12-2, so the buffers can be enabled, selectively. The address buffers 12-1 and 12-2 can be loaded with a particular bit pattern indicating the system address, in any convenient fashion. Each of the six bit inputs of each of the buffers 12-1 and 12-2 is coupled via a resistor R to a complement line 21. In addition, each input may be selectively coupled to a true conductor 22 via a jumper. In the absence of a jumper at any particular location the input to the address bus is identical to the state of the complement conductor 21. On the other hand, for those bit inputs wherein a jumper is connected, the state of the true conductor 22 overrides the effect of the complement conductor 21 because of the presence of the resistor. In accordance with one aspect of the invention, each system address employs a two out of six code and therefore two jumpers are provided for each of the buffers 12-1 and 12-2. As will become clear hereinafter the output of the microprocessor, port 2 bit positions 3 and 4 each alternate in potential out-of-phase with each other such that when the true bus 22 is in a specified condition the true version of the system address is available at the outputs of buffers 12-1 and 12-2, and correspondingly when the complement conductor 21 is in the same specified condition the complement of the system address is available at the outputs of buffers 12-1,12-2. Since the address/function bus 17 is only six bits wide, bit positions 6 and 7 of port 1 are used to enable the address buffers 12-1 and 12-2 sequentially. Accordingly, to read in the system address in both true and complemented fashion, each buffer must be enabled twice by appropriately controlling the output of bit positions 6 and 7 of port 1. The manner in which the processor controls these outputs will become clear hereinafter.

FIG. 2 also illustrates the port test sub-system 11, and as shown in FIG. 2 the port test sub-system 11 includes a six bit port test buffer 11-1 coupled to the address-/function bus 17, which is driven by an octal counter/decoder 11-2. The octal counter/decoder 11-2 has two inputs from the microprocessor (specifically bit position 0 and 1 of port 2), when asserted, the counter is reset so that the decoder provides 6 specified output bits, for example, all zeros. Thereafter, as the clock conductor is pulsed, the counter is incremented one count; and therefore, the counter/decoder 11-2 produces a sequence of bit combinations 000001, 000010, etc., through 100000, which are sequentially loaded into the port test buffer 11-1 and made available to the port 1, bit position 0 through 5 via the address function bus 17. As will become clear hereinafter the port test subsystem 11 is employed to verify the fact that port 1 bit position 0 through 5 actually "sees" signals which are appearing on the address/function bus 17.

As is also shown in FIG. 2 the true bus signal 22 and complement signal 21 are provided to function units 13. Likewise, the bus port output of the microprocessor, including eight conductors is also coupled in common to the function units 13. Since the decoder module capacity in this example, is four groups or eight half groups, asserting any one of the eight conductors enables a particular function half group. In the event that any specific encoder module has less than eight function half groups, then one or more of the signal lines on the input selection bus 19 is not associated with a function half group. A particular one of these conductors, the lowest order one (where the order of the conductor is determined by the bit position it is connected to) is coupled to a reference potential, such as for example, the negative potential shown for the system size connection. As will become clear hereinafter this is employed by the processor to determine the number of connected half groups and thus the number of words to be expected via the address/function bus 17.

A typical one of the function units 13 comprising a half group is illustrated in FIG. 3.

Referring now to FIG. 3 it should be noted that a description of most of this apparatus is found in co-pending application Ser. No. 225,813 entitled Vital Contact Isolation Circuit; the contents of which are incorporated herein by this reference. Specifically, that application explains the manner in which the condition of the contacts $C_1-C_4$ are translated into a digital output at the terminals identified as 0–3, at the righthand edge of FIG. 3. Not shown in the above-referenced application are the conductors 31,32, their associated jumpers, either J1 and J2 and J1' or J2' coupling the output of gates N1 and N2 to conductors 31 and 32, respectively, the transistors I35 and I34 and their associated circuitry or the terminals 4 and 5, also shown at the righthand edge of FIG. 3. This latter circuitry is employed to generate address bits identifying a particular function group. Group address selection is made by using either J1 or J2 and either J1' or J2' in two half groups for a total of four bits. Since both true and complement are needed the four bits identify 8 groups.

Briefly, the vital contact isolation circuit of FIG. 3 detects whether or not there is a potential at the input terminals I1–I4. As is explained in the referenced application the true and complement signals, input at the gates N1 and N2 each alternate in potential, in an offset fashion, that is when true potential is "high", the complement potential is "low" and vice versa. The other input to gates N1 and N2 is the selection input, i.e., one of the conductors in the input selection bus 19 identifying a particular half group. Thus, during the scan of the different function units only one half group at a time is enabled by the presence of its particular selection input. At the selected half group, because of the alternating true and complement inputs to the gates N1 and N2 the light emitting diode is driven thereby. $D_c$ and $D_t$, respectively, alternately produce light pulses directed at associated photo detectors $D'_c$ and $D'_t$. These photo detectors are coupled in gating and switching circuits to alternately connect positive and negative potentials to conductors $X_1$ and $X_2$, respectively, for selectively powering the bridge-like circuit to which these conductors are connected. Depending upon whether or not a potential is available at the input terminals I1 through I4 the associated light emitting diodes $D_1$ through $D_4$ will produce an optical output synchronous with either the true or complement input pulses. Accordingly, the associated photo transistors $I_{31}$ through $I_{34}$ will conduct, and pull their associated output terminals 4 through 0, respectively, low synchronous with either the true or complement timing signals. In a like fashion, depending upon which of the jumpers J1 and J2 and J1' or J2' is connected, the potential at the address terminals 5 and 4 will go low synchronous with either the true or complement input pulses. Accordingly, the change in potential at the output terminals 3-0 reflect respectively the condition of the input terminals I1 through I4 and hence the condition of the contacts $C_1$ through $C_4$, whereas the change in potentials on the output terminals 5 and 4 identify a particular group address. In addition to repeating this information at these output terminals, since the circuit is driven in a complementary fashion these output terminals provide both true and complement indications of the information; this information is employed by the processor, for encoding purposes in a manner explained below.

FIG. 4A is one specific example of the various input possibilities in 6 bits and associated encoded outputs. As is shown in FIG. 4A the 16 different 4 bit inputs are deliniated in the column headed "True Data Input" with respect to output terminals 0 through 3 of the function units. Output terminals 4 and 5 are independent of data and merely identify the associated group, therefore, a group addresses is provided by concatenating a two bit half group address, the circuit for a half group address is shown in FIG. 3. Thus, a particular six bit input can be any one of the 16 4 bit inputs in the columns 0 through 3 associated with one of the four address inputs in columns 4 and 5. The corresponding encoded words are identified, for example under the heading True Encoded Word. Of course, because of the manner in which the function units are driven, the output terminals 0 through 5 carry, in addition to the true data and group address, complement data and complement address, respectively which is merely the complement of the information identified in FIG. 4A. Likewise, as will become clear hereinafter a particular data and group address word will also generate the complement encoded word, which is also the complement of the corresponding word shown in FIG. 4A. Since six bits, encoded with a 2 of 6 code provide only fifteen different combinations, I use a different encoding for the sixteenth bit combination, which is made up of a single mark ("1") padded out with spaces ("0"). The foregoing is an example of "stuck bit" protection, on both input and output, since each bit position is repeatedly cycled. In addition, as will become clear hereinafter, the processor in addition to its other functions has the true and complement version of various inputs presented to it, and acts to prevent the transmission of encoded words corresponding to inputs which are not in true and complement form. This condition can arise, other than through a circuit failure, in the event that the contact status is changing. Since the true and complement scans are time sequential it would not be surprising to find that the contact is in one condition during a true signal time and in another condition during a complement signal time, thus providing inputs to the encoding logic which are not in true and complement form.

Before describing the operations of the microprocessor reference is made to FIG. 4B to illustrate a typical baseband message produced as a result of inputs from a two group input complex. As is shown in FIG. 4B the message includes a start of frame identifier, a group address, two system addresses, both true and complement, a group I address, a group I function, true, a group I function, complement, and group II address and function words, both true and complement (for function); immediately at the completion of the message, the next message is begun. To understand the nomenclature employed in FIG. 4B, the legend at the bottom is employed. The start of frame pattern comprises a plurality of frame marks; in a specific embodiment of the invention 2 words of marks were employed to indicate the beginning of a frame or message. Each word has start and stop bits surrounding eight marks. A group address is also eight bits, two dummies, a start and stop bits surrounding a 2 of 6 coded words. A system address, TRUE comprises 20 bits with an initial space and a trailing mark to delimit the system address. The system address comprises two words, each in a 2 out of 6 code; as shown in FIG. 4B the first system address word is 000110 whereas the second system address word is 100001; the concatenation of the system address words is the system address. The system address words are separated by the two bit group address mark, a stop mark and a stop space. A system address TRUE is followed by a system address COMPLEMENT, in which aside from the start spaces and stop marks which are identical, each bit is a complement of its corresponding bit; for example, the first word system address which was 000110 has a corresponding 5 bits in the COMPLEMENT system address which is 111001; the same is true of the second word system address. The exemplary message consists of a group one function word TRUE and COMPLEMENT, and a group two function word TRUE and COMPLEMENT. Each group has a group address. All group words begin with a start space and end with a stop mark; each group function word is made up of two half group words; the first half group for group 1 is 100010; the reader can verify that the corresponding bits in the complement are indeed the complement. Each half word also includes a group address; the first half word in group one has group address 11 and the second half word has a group address 10 to identify group 1110 or 7$_{10}$. Of course, similar remarks apply to the group two functions with both TRUE and complement. Since a system can accommodate up to 16 groups, a frame could include as many as 80 words, five for each group.

The serial output, generation which is the function of the encoder module, taken at bit 7 of port 2 is coupled to a modem.

As is shown in FIG. 2 a bit rate clock is used to interrupt the processor, via the flip-flop 40 coupled to the interrupt input $\overline{INT}$. Although not essential this is preferable since it allows an external bit rate clock to set the baud rate of the encoder module. The functions performed by the microprocessor are determined by the encoder main program shown in FIGS. 5A and 5B and an interrupt handler as shown in FIG. 5C; the latter routine is called on each interrupt from the bit rate clock. Turning first to the main program which, as will become clear hereinafter is run continuously (except of course during interrupt processing) the first function 50 is to initialize the ports and control lines, i.e., setting the bit output of each of the ports to zero.

Function 51 and 52 are performed once as part of initialization operation, and thereafter are not performed again unless the processor is restarted. Function 51 tests a word test sub-routine. The word test sub-routine itself as well as the test for the word test sub-routine is described in co-pending application Ser. No. 241,819 assigned to the assignee of this application, the disclosure of which is incorporated herein by this reference. The word test sub-routine verifies a candidate word by comparing it with a reference value using, for example, an exclusive OR operation or instruction. The first and last instructions in this sub-routine alter the candidate word as proof that the test was made on it. The sub-routine is tested at the start of program execution and once during each message frame. The test is made by setting the reference value to −1 and submitting a test word to the test. The first instruction, in altering the word, increments it to zero. If the test word is not zero, the test will fail and the output from the "fail" exit will be the test value complemented and incremented by 1. This result is used to set a pointer which is used in the next program segment. If the value is not correct the next program segment will not run correctly because a different program segment will set its pointer independently.

The next function, function 52 clears and tests the data memory; this is effected by filling the data memory with predetermined values and then summing the contents. The correct sum is required for successful execution; this function is more completely described in the above-referenced copending application Ser. No. 241,819 and therefore, no further description of this function is believed necessary.

Function 53 effects the port test. The processor first asserts the reset line and then clocks the counter. The state of the buffer is read over address/function bus 17 and is used to generate a check word. Testing each bit of the port generates a sequence of check words. The sequence of check words are retained for later use, as will be explained.

Function 54 thereafter reads system size. The processor effects this function by sequentially sensing the potential on each of the enablement lines in the bus 19. The order (bit position) of the enablement line with the selected potential is easily translated to number of groups or half groups, a parameter which is saved.

Function 55 then reads system address by sequentially enabling buffers 12-1 and 12-2 to read system address, TRUE and COMPLEMENT. The function also encodes group address and system address and loads the UART send buffer with encoded address.

Function 56 then reads each half group, TRUE and COMPLEMENT and encodes the result. Reading TRUE and COMPLEMENT merely requires sensing the bit pattern on the address/function bus 17 which is input to the processor, at both TRUE and COMPLEMENT times. Function 57 thereafter tests the input to determine whether or not the two words are complementary. Function 58 then determines whether or not the input is valid, i.e., are they truly complementary. If they are complementary function 59 loads a send buffer with the appropriate group address and the encoded word. On the other hand, in the event the input is determined not to be valid function 60 loads the send buffer with null values. In either event, function 61 then determines whether or not a UART service routine makes a request for UART service. Assuming that a UART request is not pending, function 62 determines if all half groups have been read. The processor keeps track of which half group is being read, and compares the half group just read with the system size (determined at function 54). When it is determined that all half groups have been read, then function 53 sets a pointer to the first half group and returns to reexecute function 56. If all half groups have not been read, function 56 is reexecuted with the next half group in sequence.

Assuming, back at function 61 that there was a UART service request pending, then the program jumps to function 64 (refer to FIG. 5B).

In FIG. 5B function 64 determines if this is a request for a new frame; as will be made clear hereinafter the interrupt handler routine determines when a frame has been completed and sets a flag to request a new frame. This is the flag that is checked at function 64 to determine whether or not a new frame request is pending. If it is not, function 65 loads the UART program buffer with the contents of the send buffer; the send buffer and UART program buffer hold five words, comprising a complete group; group address, TRUE and COMPLEMENT words for both half groups. Following function 65 the routine loops back to function 56 to read the next half group input. (The main program send buffer pointer is saved while the UART request is serviced. It is used unchanged when the function scan is renewed.)

On the other hand, if function 64 determines that this is a request for a new frame, then function 66 again tests the word test sub-routine; in effect function 66 is identical to function 51. Thereafter, the program moves back to function 53.

Accordingly, the encoder main program of FIGS. 5A and 5B continually reads the half groups in sequence and loads the send buffer. On request by the UART, its program buffer is loaded from the send buffer. During this process the test word sub-routine is continually tested as well as port tests being made each time a new frame is sent. At any time during the performance of these functions, an interrupt can temporarily halt this operation. The interrupt service routine is shown in FIG. 5C.

The first function (66) of the interrupt handling routine is to jump to the next task for a message bit. The particular instruction jumped to is determined by a check word, and the check word pointer is controlled by the interrupt program to generate a correctly formatted message.

More particularly, the check words stored as part of the port test are used in sequence to address program sequences, one for each task. If the port test was successful the sequence of check words will address appropriate instruction to send a valid message. Any variance in the expected sequence of check words will produce an incorrect task sequence and an invalid message (corresponding to fail-safe operation). Thus, note that as loaded, i.e., without the check words, the UART program is incomplete, it is only completed by the check word sequence.

The various tasks which the interrupt handler can directly address are tasks 0 to 3. Task 0 generates a single frame pulse, which in the specific example shown in FIG. 4A is a mark. When that is accomplished the interrupt handler returns to the main program. Of course the description of function 53, above and uses this to control the task pointer. After 2 words of marks have been transmitted the pointer is incremented to task 1. With the task pointer properly incremented, the next jump is to task 1 which, at function 69 generates a start bit, which in the example shown in FIG. 4A is a space. After generation of this space the interrupt handler routine returns to the main program, after the task pointer is set for the first bit of a word; the word can be group address, system address, or one of the group words, all shown in exemplary fashion in FIG. 4A.

At the microprocessor's next interrupt the pointer directs the program to task 3 where function 70 generates one bit of the group word. Following that function, function 71 determines if the entire word has been sent. If it has not the program returns to the main program. Each time a message bit is sent, task 3 is performed until function 71 determines that the entire word has been sent. At that point, function 72 determines if a group of five words have been sent. If it has not, function 73 controls the pointer to point to task 1. Thereafter, on the next interrupt, task 1 or function 68 is performed to generate a stop bit. The pointer is appropriately controlled thereafter to point to task 2 and so on in sequence until at some point function 72 determines that a group of five words have been sent. At that point, the program is directed to function 74 to generate a request to load the UART program buffer, from the microprocessor's send buffer. Function 75 determines if all groups have been sent; this again requires reference to the system's size. If all groups have not been sent then the interrupt handler thereafter returns to the main program to send an additional group of five words. Accordingly, additional five word groups are loaded in the UART program buffer until at some point function 75 determines that all groups have been sent. Thereafter function 76 clears the check word table, originally loaded at function 53 as a consequence of the port test, function 77 requests a new frame, i.e., this sets a flag and then the program returns to the main program. With this flag set, of course, the next time a UART service request is made function 64 will determine that this is a request for a new frame with appropriate handling.

Note that function 74 requesting a load for the UART program buffer is the flag which is examined at function 61 to determine whether or not a UART request is pending. Since function 76 clears the check word table, proper operation of the UART routine requires a new check word table, ensuring that errors will not be masked by an "old" check word table.

The legend in FIG. 5C indicates that the interrupt handler keeps track of the next task to be accomplished. Each task is defined by a separate sub-routine, but note that the interrupt handler requires an address for the appropriate sub-routine. This address is extracted from the check word table which is created during the input processing and cleared (function 76) at the end of each frame. If the check word table, or any entry therein, is inappropriate, the interrupt handler will not address the appropriate sub-routine for the task, the proper message format will not be followed and therefore, as will be seen, the decoder will not accept the message, or at least the incorrect portion.

From the foregoing description it should be apparent that the message which is shown in exemplary fashion in FIG. 4A is composed and transmitted. It should be noted that the format provides very high security in that there is unique group system addresses present, unique addresses for each group within a system, a restricted number of valid words (two out of six code in this example) and transmission of data bearing words in true and complemented form. The decoder, as will become clear hereinafter, tests the received message for each of these elements before accepting the message.

MESSAGE DECODER MODULE

The message decoder module is shown in block diagram form in FIG. 6, and in more detail in FIGS. 7 and 8. Referring firstly to FIG. 6, the message decoder module is illustrated as comprising a message decoder logic 100, a check word decoder logic 101, a vital port control 102, vital ports 103, a vital driver 104 and a UART 105. In general, the message decoder logic decodes the messages and sends commands (in a specific embodiment, for example, a relay selection, or in other words data) to a specific vital port or ports and also sends check words to the check word decoder for verifying correct operation. The check word decoder verifies the check words are correct and in that event supplies a vital signal to a vital driver 104 to enable the supply of vital power to the vital ports in order to make the commands effective. More particularly, a serial bit stream is received, at baseband by the UART 105. The UART strips framing, start, and stop bits from the serial bit stream, and each time a word has been assembled, provides an interrupt to the message decoder logic 100 and makes that message word available to the decoder logic for processing. The vital port control provides vital port selection and port address delivery. The vital ports comprise latches and drivers for commands, latches for port address, and input ports for reading the states of the latches and drivers. The check word decoder 101 processes the check words received from the message decoder logic 100 and, in response to proper check word sequence generates a unique signal, for example, a predetermined frequency. The frequency is detected by the vital driver 100 which supplies a potential to the vital ports for enablement of its outputs. The vital driver is arranged such that its output potential is nowhere else available in a message decoder module.

As will become clear hereinafter, a vital port is provided for each group (two half groups) and thus corresponds to eight functions or outputs. Relay drivers contained in the output ports are isolated from the other logic elements preferably by optically coupled isolators so that relays driven by relay drivers can be energized by a signal system power, rather than the electronic system power. Generally, the signal system power is a battery. As is shown in FIG. 6, message decoder logic 100 also responds to the state of the vital ports, and preferably the output of the vital ports in relation to the inputs to the message decoder logic 100 to test for a specified relation. For example, these connections could be wired with a shift, or fixed scrambling of the data so that the decoder can verify that it is using actual port output and not a signal provided to it by the message decoder logic 100. The vital ports 103 also includes latches for port address and commands, these latches are clocked by the vital port read pulse provided by the vital port control. Tristate buffers or inverters in the vital ports enable the contents of the latches to be read into the message decoder logic 100 for checking. The state of a command buffer is detected in the relay driver circuitry so that the relay driver is checked in addition to the buffer.

Turning now to FIG. 7, a more detailed illustration is provided of the message decoder logic 100, check word decoder logic 101, vital port control 102 and the interconnection of this circuitry to UART 105. The message decoder logic 100, check word logic 101, vital port control and address buffer can be implemented with conventional commercially available components.

In operation, at power up processor 100 is initialized during the first received frame. If no message is received processor 100 merely waits. During normal operation, the processor 100 responds to interrupts from the UART 105, processes the message words and performs tests to assure that all outputs are correct. In the course of this processing the processor 100 reads system size at the start of every message frame via the I/O expander 100B. In accordance with FIG. 4B, the first five, eight bit message words (the frame marks, start spaces and stop marks are stripped by the UART and are not seen by the processor 100) are group address, the system address true and system address complement; which generates five eight bit words. These five words, are the first five message words following receipt of the framing pattern. These five words are used in the processor 100 to generate check words. Subsequently received words i.e., the data, are placed in a vital stack called the message buffer. Each group, including group address, true and complement function words generates five eight bit message words (the start, space and stop mark again being stripped by the UART). These five words pertaining to a single group are checked for validity, that is, the appropriate bits are complements of each other. When this test is passed, the group address bits are separated from the functions and the two parts are decoded by a table using a binary search. The group addresses are decoded to produce vital port addresses which are stored in a vital stack called the port address buffer. The true message word are decoded to commands, and the complement message words are decoded to images. The commands and images are stored in a vital stack termed the command stack. The appropriate vital port, i.e., the one addressed by the group address, is tested by a port test sub-routine and upon successful completion, the addresses and commands are delivered to the addressed vital port.

If the group of five message words had not been valid, the words would not have been decoded, but on the other hand, the port would have been tested and then loaded from the command stack. The use of the stack prevents the loss of output from the system if there is an occasional message drop out due to noise. Since the stack is vital, the contents are destroyed when they are used so that the output is sustained for a specifically limited period of time.

After deivery of the commands and the addresses, and before the data is actually employed, the vital port contents are tested by reading them into the processor and building check words. These check words will have the proper value only if the port addresses and commands, as read, correspond with their images. All port contents are checked repeatedly at a rate that will detect incorrect outputs in less time than the pickup time of a vital relay.

Additional check words are generated by the port test sub-routine, the system size input and clearing of the vital stacks. These check words are verified in the check word logic and are used to enable the vital driver processor to generate the vital power required to energize the vital ports.

Depending on the processing sequence in the decoder logic a series of check words are generated. Thus, a first series is generated, if processing is error free, during the course of receipt of a message frame. A different series of check words are generated if one or more messages are received in error but can be replaced by corresponding words from the command buffer. The sequence of check words provides information on the type of processing effected in the decoder logic. Clearly, the sequence of check words seen by the decoder check word logic, then can be used to determine if the processing has resulted in valid data. That is, while the check word sequence is not fixed, there are a few allowable patterns or sequences. The decoder check word logic processes the check words, in a manner shown in my prior U.S. Pat. No. 4,181,849, to energize or not energize the tuned vital driver. Thus, not only must the processing in decoder processor produce a condition in the decoder processor which is prima facie allowable, but the separate decoder check word logic must produce an allowable condition using different data, different hardware and different logic, (an example of diversity) before a usable output (at the port) is provided.

A counter in the processor 100 counts received clock pulses and produces a timer interrupt if the UART interrupt does not appear at the expected time. Timer interrupts occur if a UART interrupt is missed for any reason. If a timer interrupt occurs the system loads the next port from the command buffer and waits for the next interrupt from the UART.

Before describing the detailed functioning of the decoder processor 100 reference is made again to FIG. 7 and to FIG. 9 which illustrate a typical vital port. Each vital port includes an address latch 200 and a command latch 203; as is shown in FIG. 9 the address latch is four bits in capacity whereas the command latch is eight bits. The output of the address latch 200 is coupled to the input of a tristate buffer 201. A write line enables the address latch 200 whereas a read line enables the address buffer 201. A four bit wide input to the address latch 200 is provided by the address bus, referred to in FIG. 7 as a port address bus. The output of the four bit buffer 201 is coupled to a group address bus which is again referred to in FIG. 7 as a port address bus. This configuration enables the vital port control 100B to write and read port addresses. In addition, and referring to FIG. 7, the lowest order unused port address read and write control lines are coupled to a selected potential so that system size can be read by the decoder processor 100 via the vital port control in a similar manner to that used in the encoder.

Although the decoder processor 100 checks the coincidence between its command output and that registered in a vital port, this check is accomplished in a way so as to check the buffer as well as the relay drivers. To this end the latch 203 (referring again to FIG. 9) drives an eight bit inverter 204. Each output connection of the inverter 204 is coupled to a positive potential through a different light emitting diode 205. Accordingly, the inverter 204 is coupled to eight different light emitting diodes 205, although only a single one is illustrated in FIG. 9. Light emitting diode 205, when energized, produces an optical signal which impinges on photo detector 206 connected so as to drive inverter 207. When photo detector 206 detects an optical signal and drives inverter 207 so that its output goes low, then the vital relay R is energized via a path from conductor A through the vital relay to the inverter 207. Diode 208 is a surge suppressor to prevent the inductive kick from the relay coil flowing out the drivers. Diode 209 isolates the relay/diode 208 combination from the test circuit (Q1) so that the output of 207 can go high (5 volts) if vital + is zero. Conductors A and B are provided with a potential difference of 5 volts via the zener diode Z. The source of power for conductor B is the vital driver 104, which provides this potential only in response to a particular frequency output of the check word decoder logic 101. The main in which that particular signal is produced is explained hereinafter. The vital driver 104 is any frequency sensitive device for generating a vital potential which is a potential not provided by any power supply in the message decoder module. An example of a vital decoder is described in my previous patent entitled "Fail Safe Logic System"; U.S. Pat. No. 3,995,173. An additional light emitting diode 210 is coupled between the conductors B and A in a circuit including a transistor Q1. The base of transistor Q1 is coupled to conductor A through a diode 211 and is also coupled to the output of inverter 207 via a large film type resistor 212. The conductor B is also connected to the output of inverter 207 via another large film type resistor 213. Accordingly, if the output of inverter 207 is driven sufficiently low, it can cut off transistor Q1. If the output of inverter 207 is not driven low enough, then the resistor 213 can maintain the transistor Q1 conducting. On the other hand, when the inverter 207 is not driven, the transistor Q1 conducts and the light emitting diode produces an optical signal. Thus, in response to a command to pick the relay R, the optical signal from LED 210 is removed. Photo diode 215 is arranged in optically coupling relation to the LED 210. The circuit in which the optically responsive diode 215 is connected provides the input to a stage of inverter 202 corresponding to the stage of latch 203 which drives the light emitting diode 205. Accordingly, when the relay is energized diode 210 does not produce a signal, the input to the corresponding inverter goes low and the output goes high. Of course the buffer 203 is enabled by the write signal and the inverter 202 is enabled by the read signal, just as in the case of buffer 200 and buffer 201. It should be noted, in connection with the command information that the data placed on the command bus via inverter 202 reflects the condition of the relay driver and not merely that of the buffer 203.

Figure 8A:
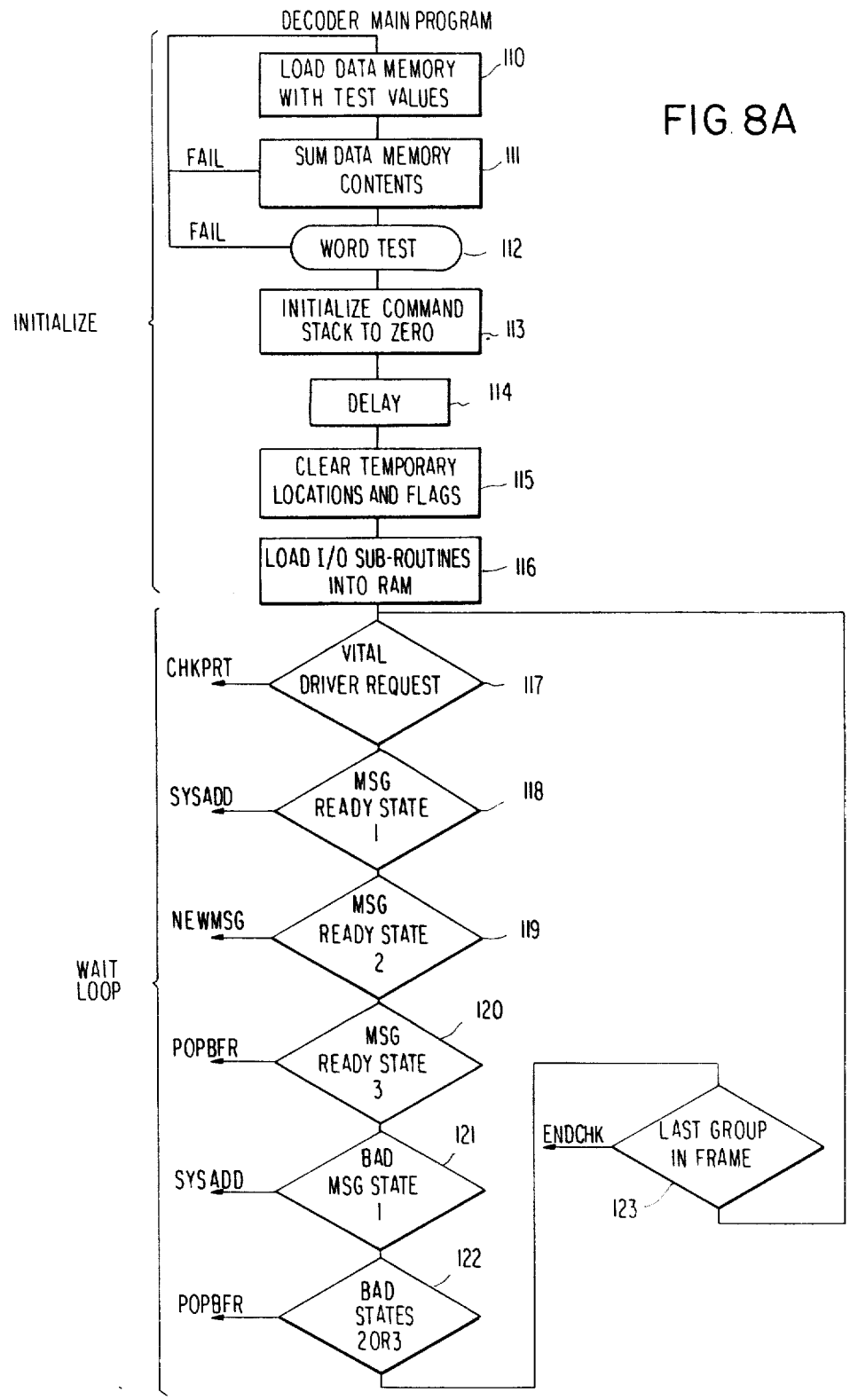
FIGS. 8A–8G comprise a flow chart of the decoder processor program.
Figure 8B:
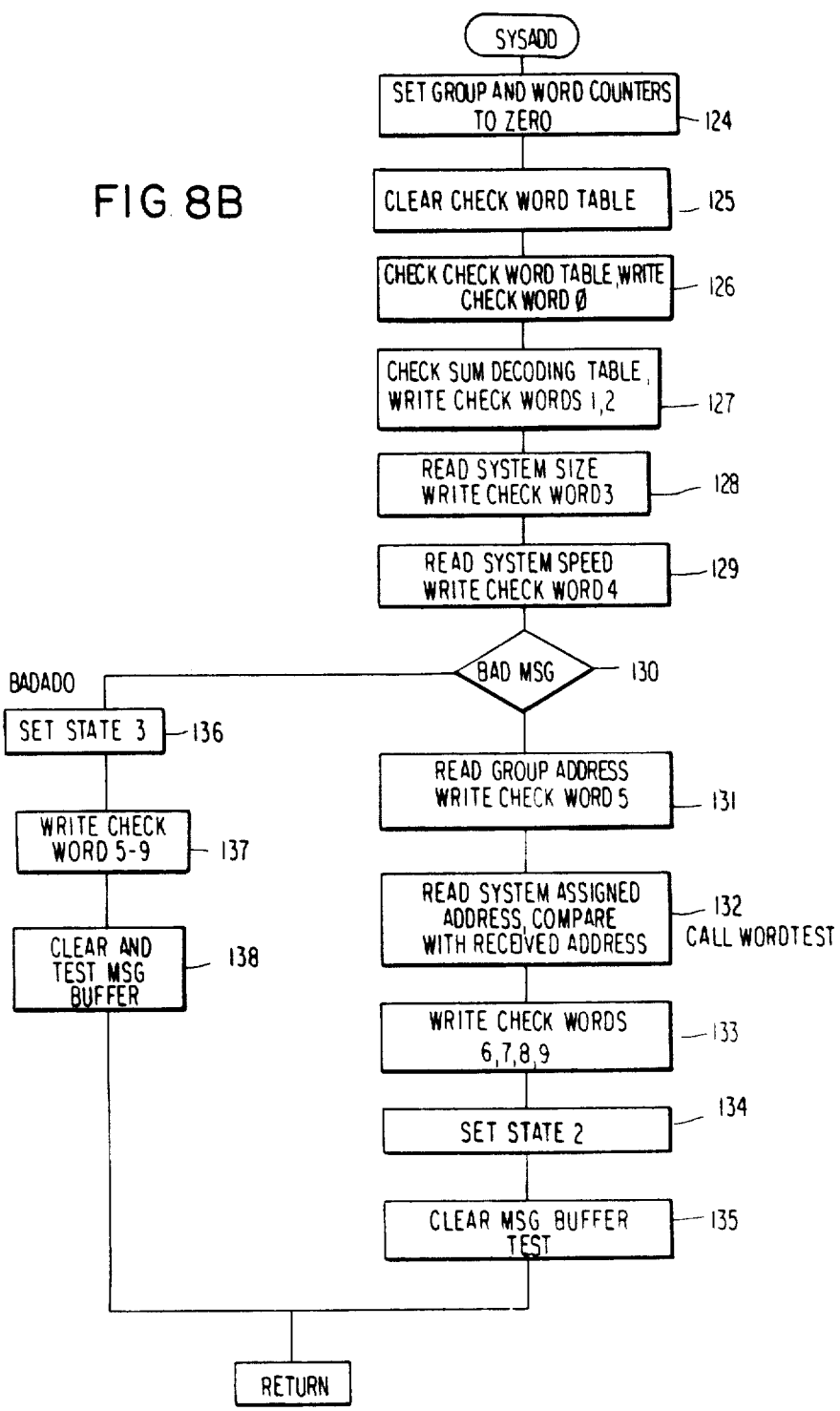
Figure 8C:
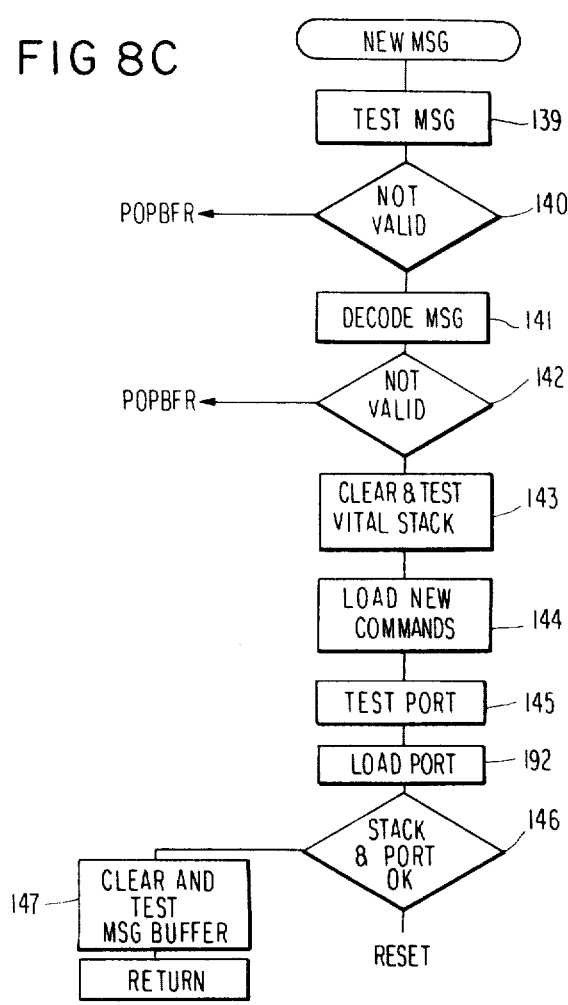
Figure 8D:
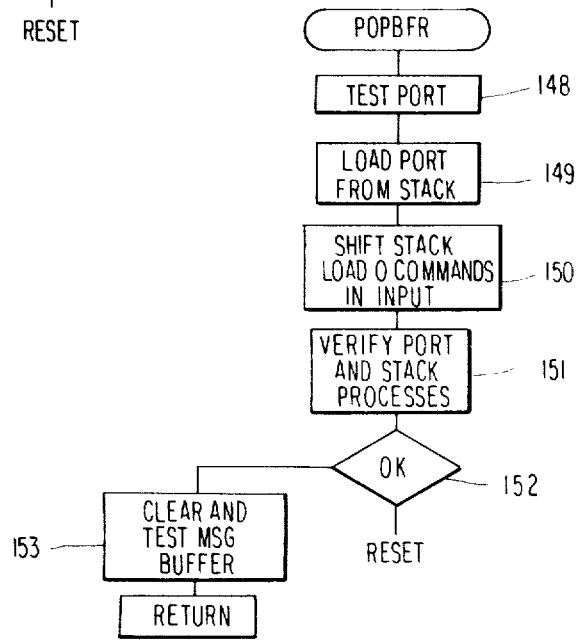
Figures 8E, 8F:
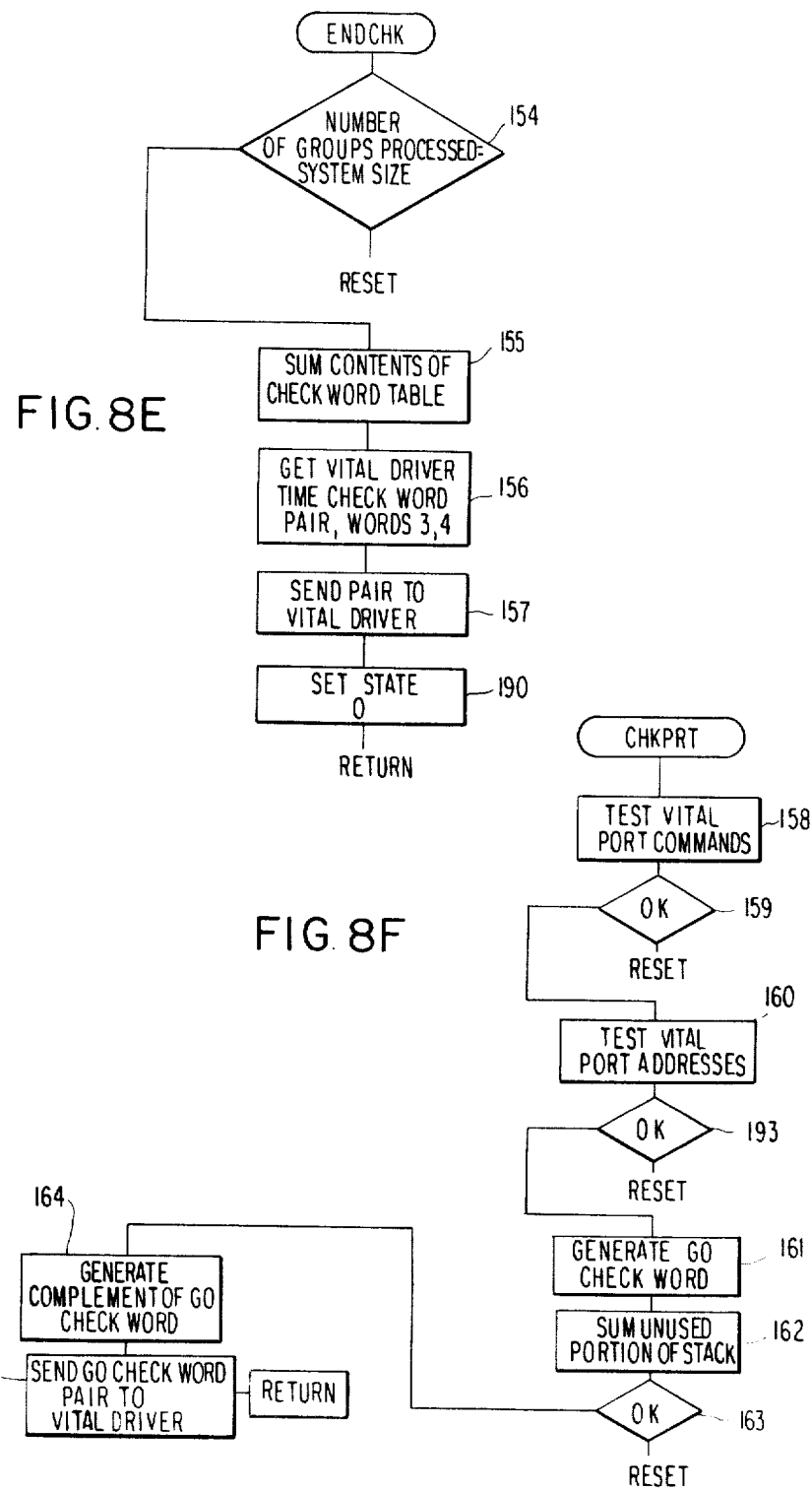
Figure 8G:
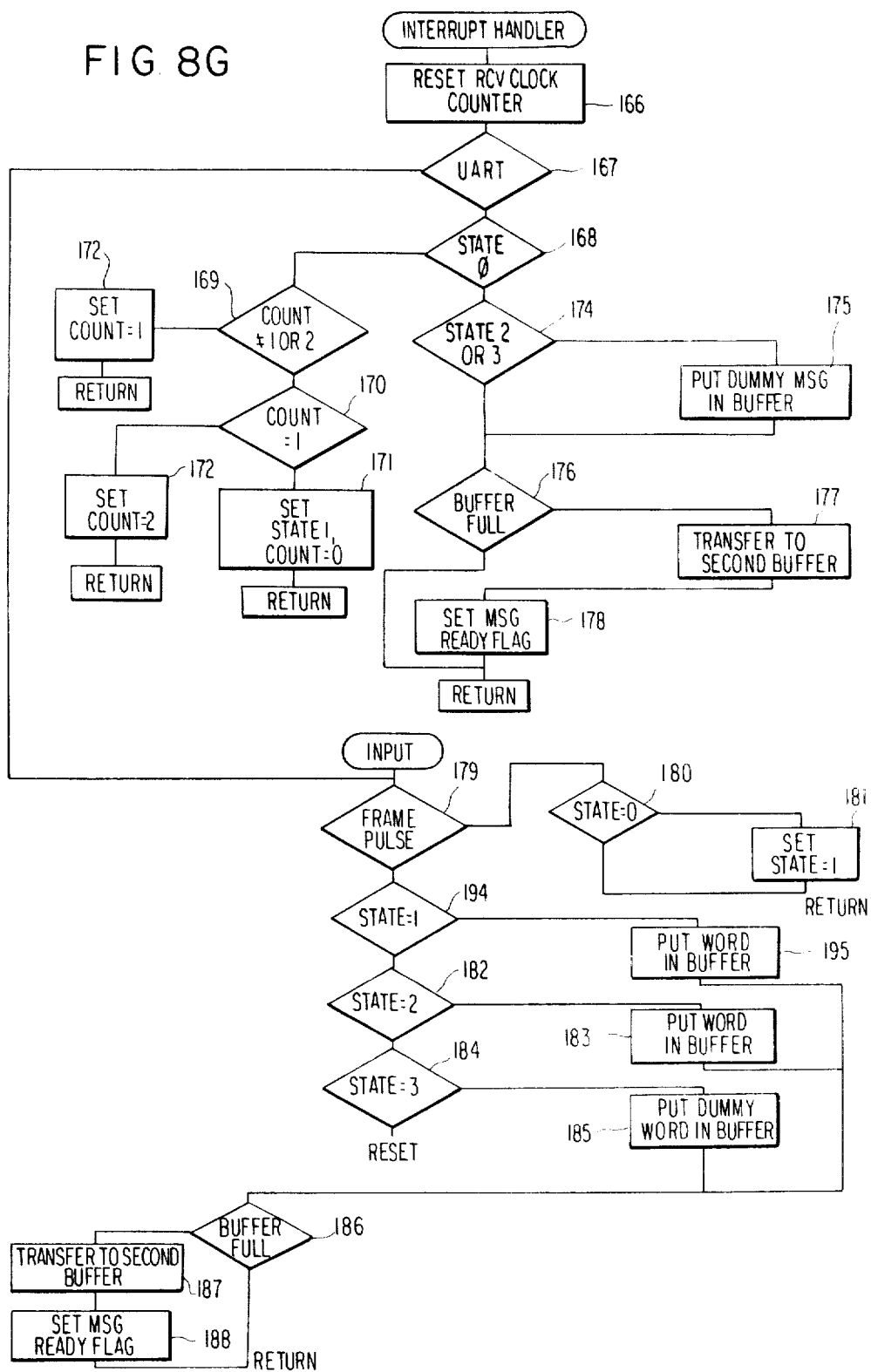

Now in order to explain the processing carried on by the message decoder logic 100 and its interaction with the vital port control 102, vital ports 103 and the UART 105, reference is made to FIGS. 8A through 8G; FIGS. 8A showing the main program, FIGS. 8B–8F showing subroutine and FIG. 8G illustrates the interrupt handler.

The decoder, in the course of processing messages exists in one of four states, identified as states 0–3. These states are defined as:

State 0—waiting for start of frame;
State 1—waiting for receipt of valid system address;
State 2—accepting new command messages;
State 3—servicing ports from the vital stack.

In the course of processing the state may be set or read in order to assist in identifying those functions to be performed.

Turning now to FIG. 8A, when the processor 100 is started, on restarted, function 110 loads the data memory with test values. Function 111 sums the data memory contents and determines whether or not that test has been passed. Assuming it was passed, function 112 performs a word test on the word sub-routine, and if that test fails the program is restarted. The testing of the word test sub-routine and testing of the data memory are tests previously described herein and more completely described in my copending application, filed Mar. 9, 1981, Ser. No. 241,819. Assuming the tests are properly passed function 113 initializes the command stack (part of the data memory) by zeroing its contents. Function 114 provides a time delay before running of the remaining steps. The manner in which the delay is effected and the reasons for the delay are explained in the above-referenced copending application Ser. No. 241,819. Subsequent to the delay, function 115 clears temporary locations and flags. Function 116 loads I/O subroutines into read/write memory. Functions 110–116 comprise an initializing routine which is run each time the processor is started or restarted. Functions 117–223 comprise a wait loop which is exited depending upon a particular event. Thus, for example, if function 117 determines that a vital driver request is pending then the exit is to the sub-routine CHKPRT.

On the other hand, if function 118 identified that a message is ready and the machine is in State 1, then the exit is to a sub-routine SYSADD. In a similar fashion, if function 119 identifies a message ready, and the machine is in State 2, then the exit is to the sub-routine NEWMSG. If functions 120 or 122 detect a message ready, State 3 or a bad message, States 2 or 3, then the exit is to POPBFR. If function 121 identifies a bad message, with the machine in State 1 then the exit is to SYSADD. Finally, if function 123 identifies a last group in the frame, then the exit is to a sub-routine ENDCHK. The sub-routines just referred to are shown in more detail in FIGS. 8B-8F. In the course of receiving a message, the decoder receives an interrupt from either its associated UART or an internal clock counter. Since the processing depends heavily on information passed from the interrupt handler (shown in FIG. 8G) that operation will now be explained.

As shown in FIG. 8G the first function on detection of an interrupt, function 166 sets the receiving clock counter, to enable to monitor receipt of the next message. Thereafter, function 167 determines if this is a UART interrupt or not. The particular processor employed in an embodiment of the invention includes the timer input which, as shown in FIG. 7 is coupled to a receiving clock. The timer can be set to provide an interrupt after a given number of inputs or clock pulses. The timer is set such that it provides an interrupt in a period slightly longer than the time taken to receive a message word, if the message word is received while the timer is timing or counting, the timer is reset via function 166.

Assuming that the interrupt was from the UART, then processing skips to function 179 where the processor checks for a frame pulse, actually two words of marks. If that is the case, then function 180 determines if the machine is in State 0. If it is, then the transition to State 1 is appropriate since the frame pulse or frame marking has been received. Accordingly, function 181 is performed to set the state of the machine to 1. The state of the machine is merely a count contained in a temporary register which is set and/or read in the course of processing. Under those circumstances, that concludes the interrupt handling.

On the other hand, if function 179 determined that the received word was not a frame pulse, then function 194 checks to see if the state is 1. If it is, then the word in the UART is either a group or system address and it is loaded in a (message word) buffer. If the received word is not the frame pulse and the machine state is not one, then function 182 determines if the machine is in State 2. The machine will only achieve State 2 if, as will be seen hereinafter, a valid address has been received. Accordingly, in that event function 183 is performed to put the message word in the message word buffer. Whenever the buffer is loaded, function 186 determines if that buffer is full. Since the buffer has a bit count greater than that shipped over by the UART it is loaded via a sequence of interrupts. If the buffer is not full, that concludes the processing. On the other hand, if the buffer is full function 187 is performed to transfer the contents of the buffer to a second buffer; this allows for processing of the received message words while additional words are being received and loaded into the first mentioned buffer. Following function 187, function 188 is performed to set a message ready flag; this is the manner in which the wait loop identifies that a message is ready. In those circumstances that concludes the interrupt processing.

On the other hand, it may well be that function 182 determines the machine is not in State 2; in that event function 184 determines if the machine is in State 3. State 3 is achieved if an address is received which does not pass the appropriate tests. In those circumstances it is not appropriate to accept the associated message and therefore, function 185 is performed to put a dummy message in the buffer. This dummy message will not be recognized as a valid message by the decoder, however this processing maintains the system components in synchronization. The processing subsequent to performing function 185 is similar to that performed subsequent to function 183. Finally, if the machine does not recognize a frame pulse and if it is not in States 1, 2 or 3 in response to a UART interrupt, an error condition is identified and accordingly, the processor is reset.

In the event that the interrupt which called the interrupt handler did not occur as a consequence of a UART interrupt, then function 168 is performed to determine whether or not the machine is in State 0. If the machine is in State 0 under these circumstances, a frame pulse has been missed for some reason; perhaps a signal dropout or other random event. In order to maintain this system in step the frame pulse will be simulated. Accordingly, a count is maintained and function 169 checks to see whether the count is not equal to 1 or 2. If it is not, function 172 is performed to set the count equal to 1. On the other hand, if the count is equal to 1 or 2 then function 170 is performed to determine if the count equals 1. If it is, function 173 is performed to set it equal to 2. On the other hand, if the count is not equal to 1 then it must be equal to 2, meaning that the second frame pulse has been simulated. Accordingly, function 171 sets the state equal to 1, returns the count to 0 and that concludes the processing. Accordingly, functions 169-173 can simulate one or both of the words comprising the frame pulse.

If, on the other hand, the timer interrupt occurred when the machine was in State 2 or 3, then function 174 recognizes this condition and function 175 puts a dummy message word in the buffer. States 2 or 3 indicate the machine is expecting message words, timer expiration means that a message word for some reason has not been received. Thus function 175 simulates the message word. Thereafter, function 176 checks to see if the buffer is full, if it is, function 177 is performed to free it up by transferring its contents to the second buffer. Following function 177, function 178 is performed to set the message ready flag. On the other hand, if the buffer is not full, processing is concluded.

Accordingly, the interrupt handler can set the machine state from zero to one based on receipt of a frame pulse or simulation of a frame pulse. It can also load a message word into the buffer or a dummy message word into the buffer if no message word is available. Furthermore, it will free up the message buffer by transferring its contents to a second message buffer when the message buffer becomes full and at the same time set the message ready flag to indicate that processing is appropriate.

When the wait loop recognizes a condition with the message ready flag set, with the machine in State 1 it exits the wait loop (in FIG. 8A) to SYSADD—(See FIG. 8B).

As shown there, function 124 sets the group and work counters to 0; the group counters will count the number of groups received, the work counters are used for temporary storage. Function 125 thereafter clears the check word table, the uses for the contents of the check word table will become apparent as this description proceeds. Function 126 sums the contents of the table to ensure it has been cleared and as a consequence of the check, writes check word zero. To properly complete the processing this check word must correspond to the expected value. Function 127 check sums a decoding table, which is used in the binary search for decoding the message words. As a result of this check sum operation check words 1 and 2 are written. Function 128 reads the system size (See FIG. 7). A corresponding check word is prepared. Function 129 reads system speed in the same fashion as function 128 read system size, and a further check word 4 is written. Function 130 checks to see if a bad message has been received. This test is performed on the system address words, TRUE and COMPLEMENT and a bad message is detected if the appropriate bits do not exhibit the appropriate relationship. Assuming that a bad message has not been received function 131 reads the group address, which is received along with system address and writes a check word 5. Function 132 thereafter reads the system assigned addressed (See FIG. 7) and compares it with the received address. The word test sub-routine may well be used for this process. Function 133 then writes words 6, 7, 8 and 9 to reflect the relation between the received system address and the locally specified system address. Function 134 sets the machine state to 2 and function 135 clears the message buffer and tests that operation.

On the other hand, at function 130, if a bad address has been received function 136 sets the machine state to 3. As we will see this results in ignoring the received message words; this is essential since the inability to verify system address may well means the message was not directed to the decoder. Function 137 writes check words 5-9; these check words are indicative of the particular processing path being followed. That is, that are different from check words 5-9 written by functions 131 and 133. Function 138 then performs a function similar to function 135 and that concludes the processing.

Overall, therefore, this sub-routine prepares check words 0-9, verifies that the received group address compares to the locally assigned group and system address and sets the machine to either State 2 or 3 depending upon whether or not the system address passed the system address test.

When the message ready flag is again set with the machine in State 2, function 119 recognizes this condition and calls sub-routine MEWMSG, shown in FIG. 8C.

As shown in FIG. 8C function 139 tests the received message to ensure that it is properly encoded in the two out of six code. Function 140 branches depending on the outcome of the test, if the test is passed function 141 is performed to decode the message. Thereafter, function 142 tests the decoded message to ensure that the message words are complementary. If either test is failed a branch is made to POPBFR (to pop the buffer or read the entry in the vital stack). Assuming the tests are passed, function 143 clears and tests the vital stack. Function 144 loads the new commands into the vital stack. Function 145 thereafter tests the associated port. Referring to FIGS. 7 and 9, the processor 100 and vital port control 100B can both write address and command into the vital port as well as read address and command from the vital port. The test vital port performs a series of steps, one step for each of the eight functions in the port. In each step of the test one of the address bits and only one of the command bits, and only one, is written to the associated buffer. Thereafter, the buffer is read to verify that the port is properly responding to its inputs. The writing and reading is effected in such a short length of time that none of the output relays R will respond to writing into the command buffer. This test therefore, verifies that each of the bit positions in the port is under control of its input. A further result of this test is the production of a check word. Function 146 branches on the tests performed on the vital stack and port (functions 143 and 145). If these tests are not passed the processor is reset. However, if the tests are passed then function 147 clears and tests the message buffer.

If in the course of running NEWMSG, an invalid decoded message was detected then POPBFR is performed. Those functions are shown in FIG. 8D. Function 148 tests the vital port, and is entirely similar to function 145, as discussed above. Function 149 loads the port from the stack. This is different from function 192 which loads the port from the message buffer. POPBFR is being run because for one reason or another the message was not considered valid. Accordingly, the previously received message, which had been loaded into the stack (at function 144) is read out and used to load the port. Function 150 thereafter shifts the stack to load 0 commands in the input level ensuring that their contents can only be used once. Following function 150, function 151 is performed to verify the port and stack processes, in a fashion similar to function 146. Function 152 branches on the result, if either the port or stack processes are not O.K. The processor is reset. On the other hand, if the tests are passed then function 153 is performed to clear and test the message buffer.

The same sub-routine can be run in the event that function 120 detects the message ready flag set with the machine in State 3. Accordingly, each message word which is received with the machine in State 3 results in an exit from the wait loop to POPBFR wherein the previously received commands (from the stack) are loaded to the port rather than the message words. A similar result can be effected via function 122 with a bad message flag being set in State 2.

In the course of the interrupt processing, the number of groups received is counted and when that number of groups matches system size a flag is set so that function 123 recognizes after receiving each of the message words in the last group that the last group has indeed been received. At that time ENDCHK is run; this processing is shown in FIG. 8E. As shown in FIG. 8E when ENDCHK is called, function 154 compares the number of groups processed to system size. The number of groups processed can be determined by counting the number of times NEWMSG is called. This may well be different than the number of different groups run through the interrupt handler. Assuming the sizes compare, processing continues, in the alternative the processor is reset.

Function 155 sums the contents of the check word table and appends the sum as the last check word. Function 156 obtains a check word pair (words 3 and 4) for the vital driver and function 157 outputs this pair to the vital driver. Function 190 sets the state to zero, since the frame is now concluded. That concludes the processing.

The check words shipped off to the vital driver are related to system address, system speed and system size inputs. These check words are used to set the driver relay sustain time and enable it to generate the appropriate frequency which is detected and used to drive system outputs. The manner in which the relay sustain time can be varied and the manner in which an appropriate frequency output is produced by a pair of check words such as those input to the vital driver via function 157 is shown in my U.S. Pat. No. 4,184,819.

The only sub-routine processing not discussed is CHKPRT, which is called on an interrupt from the vital driver. The vital driver is arranged, for example, to call for this check every sixty milliseconds. In order for the vital driver to maintain its output it must receive the appropriate response at the same rate. The vital port contents are tested by reading them into the decoder to build check words. The check words will have the appropriate value only if the port addresses and commands as read correspond with their images. Thus, the test at function 158 and 159 test the vital port commands, the tests at 160 and 193 tests the addresses. Only if both tests are passed is function 161 performed. If either test is failed the processor is reset. Assuming that the tests are passed, however, function 161 is performed to generate a go check word. However, before that is used, function 162 is performed to sum the unused portion of the vital stack, if truly unused the sum should be known, and function 163 tests it. Failing the test results in resetting the processor. Assuming the test is passed, function 164 is performed to generate the complement of the go check word and function 165 ships the go check word and its complement to the vital driver. Since the vital driver requests the go check word pair at a rate sufficient to detect any errors in the ports, and requires an appropriate response, system outputs are released if the ports do not pass the appropriate tests.

The preceding discussion explains the manner in which a serial bit stream message is received, the non-data or address bearing bits removed in the UART, and the address and data passed on to the processor 100, the manner in which the processor 100 treats that data to generate address and commands in decoded form and applies those address and commands to the vital port. The discussion of the vital port also describes the manner in which the commands and addresses input to the vital port are rendered effective to energize devices which may be connected thereto, such as relays R in the presence of the vital power supply signal. The discussion has also indicated the manner in which the vital power supply signal is produced by the driver in the presence of the appropriate output of the check word decoder logic 101, corresponding to the vital processor 101 in FIG. 7. The discussion has also indicated that at various points in the program various check words are developed. At the time the check word is developed, the processor 100 signals the processor 101 via the check word ready signal which interrupts the vital driver processor 101 and which thereafter returns a check word request to the processor 100. This allows the check word to be placed on the check word/command bus and made available to the vital driver processor 101. Accordingly, as the processor 100 performs its various tasks various check words are made available to the vital driver processor 101. The vital driver processor 101 can be the processor disclosed by my previous U.S. Pat. No. 4,181,849 entitled Vital Relay Driver Having Controlled Response Time. Those skilled in the art will recognize that the system disclosed in that patent provides for energizing a tuned vital driver with a specific frequency input based upon a number of conditions, one of which is the receipt of appropriate check words.

What is claimed is:

1. A digital communication system comprising at one station:

input means for sensing a potential of one or more groups of input lines and generating a digital word for each group of input lines and encoding means responsive to digital words from said input means for transmitting representations of said digital words, said input means comprising N input groups, wherein N is an integer greater than or equal to one, each input group comprising a fixed number of input lines, said input means generating a first digital word of a given bit count and its complement corresponding to each said group in response to an enabling signal wherein each bit of said first digital word and said complement corresponds to a different input line of a respective input group, and said encoding means comprising:

a multiport digital processor with an input port, responsive to said input means, and a first output for providing a serial encoded digital bit stream including representations of digital words generated by said input means, each said representation having a greater bit count than said given bit count, said serial encoded bit stream including true and complementary representations corresponding to said first digital word and its complement, respectively, a second output of said digital processor coupled to said input means for providing said enabling signal to each of said N input groups, in turn.

2. The digital communication system of claim 1 in which said input means further includes:

a port test buffer, means coupler an output of said port test buffer to said input port of said multiport digital processor and wherein said multiport digital processor includes a third output and means to control the state of said port test buffer by said third output and to derive different check words in response to different states of said port test buffer;

and control means in said multiport digital processor for generating said serial encoded digital bit stream if said check words form a fixed pattern.

3. The apparatus of claim 2 wherein said means to control the state of said port test buffer includes a counter and a buffer control signal generator and a clocking signal means to drive said counter with a periodic signal.

4. The apparatus of claim 1 which further includes system sizing means for indicating the number N wherein said second output includes signal lines for each of said groups, up to a fixed number of groups M wherein N is less than or equal to M, means coupling at least a selected one of said signal lines to a predetermined potential if M is greater than N, and means in said multiport digital processor for storing a representation of the number N by identifying which of said signal lines, if any, is coupled to said selected potential.

5. The apparatus of claim 4 wherein said multiport digital processor includes means to compare the number of enabling signals provided to said input means with said number N, and to continue providing enabling signals until the number of enabling signals is equal to N.

6. The apparatus of claim 1 in which said second output includes an enabling line for each of said N input groups and wherein said input means includes means responsive to a timing signal and to each of plural enabling lines for generating an alternating binary signal which alternates in the sense determined by the condition of an associated input line, said second output of said processor including a pair of lines carrying said timing signals and a plurality of enabling lines, each related to a different group of said input lines, said plurality of enabling lines each carrying a unique enablement signal.

7. The apparatus of claim 1 wherein said input means generates an output including at least a pattern of a first digital word and a complement thereof, said multiport digital processor including:

port check means for checking operability of said input port and for generating a check bit pattern as a result of said checking, means for encoding and transmitting representations of said first digital word and a complement of said first digital word only if said words are complementary, said means for encoding and transmitting, operating in accordance with said check bit pattern.

8. A digital communication system comprising a station including:

decoder logic means for decoding an input thereto to produce a decoded output, port means for transferring a decoded output to an output device and decoder logic check means for checking operation of said decoder logic means said decoder logic means comprising first means responsive to receipt of a first predetermined number of message words for verifying that a first plurality of said message words is complementary to a second plurality of said message words, second means for decoding said message words to produce a decoded output including a command and an associated address and for writing said command and associated address to said port means if, and only if said first means verifies said message words, third means responsive to receipt of a second predetermined number of message words to generate a check word, said port means including buffer means for storing address and command transmitted by said decoder logic means, fourth means in said decoder logic means for verifying operation of port means and for generating a further check word, and decoder logic check means responsive to check words from said decoder logic means for generating a permissive output if, and only if, said check words comprise one of a plurality of allowed check word sequences, said output device coupled to said port means and repeating information from said port means if, and only if said permissive output is present.

9. The apparatus of claim 8 in which said decoder logic check means includes means to generate said permissive output only if sequentially supplied with said check words within a fixed time.

10. The apparatus of claim 8 wherein said second means also writes said command and associated address to a read/write memory each time said message words are decoded, and wherein said decoder logic means includes buffer means to write commands and addresses to said port means from said read/write memory if said first means fails to verify said message words.

11. The apparatus of claim 10 wherein said buffer means includes means to clear said read/write memory written by said second means.

* * * * *